(12) United States Patent
Lessing et al.

(10) Patent No.: US 11,154,992 B2
(45) Date of Patent: Oct. 26, 2021

(54) SOFT ROBOTIC ACTUATORS FOR POSITIONING, PACKAGING, AND ASSEMBLING

(71) Applicant: Soft Robotics, Inc., Bedford, MA (US)

(72) Inventors: Joshua Aaron Lessing, Cambridge, MA (US); Daniel V. Harburg, Amsterdam (NL); Sarv Parteek Singh, Cambridge, MA (US); Mark Chiappetta, Westford, MA (US); Ryan Knopf, Cambridge, MA (US)

(73) Assignee: SOFT ROBOTICS, INC., Cambridge, MA (US)

( * ) Notice: Subject to any disclaimer, the term of this patent is extended or adjusted under 35 U.S.C. 154(b) by 429 days.

(21) Appl. No.: 15/956,804

(22) Filed: Apr. 19, 2018

(65) Prior Publication Data

US 2018/0304473 A1    Oct. 25, 2018

Related U.S. Application Data

(63) Continuation of application No. 15/605,499, filed on May 25, 2017, now Pat. No. 9,975,251.
(Continued)

(51) Int. Cl.
*B25J 15/00* (2006.01)
*B25J 15/10* (2006.01)
(Continued)

(52) U.S. Cl.
CPC ......... *B25J 15/0023* (2013.01); *B25J 9/0093* (2013.01); *B25J 9/142* (2013.01);
(Continued)

(58) Field of Classification Search
CPC ........ B25J 15/0023; B25J 15/10; B25J 15/12; B25J 9/0093; B25J 9/142; B25J 11/0045;
(Continued)

(56) References Cited

U.S. PATENT DOCUMENTS

| 1,675,957 | A | * | 7/1928 | Reeves Orwell | .... | B65D 81/052 |
| | | | | | | 206/522 |
| 2,695,190 | A | * | 11/1954 | Ernest | .................. | B65B 21/186 |
| | | | | | | 294/119.3 |

(Continued)

FOREIGN PATENT DOCUMENTS

| CN | 1365311 A | 8/2002 |
| CN | 203680318 U | 7/2014 |
| CN | 105364940 A | 3/2016 |

*Primary Examiner* — Dean J Kramer
(74) *Attorney, Agent, or Firm* — Kacvinsky Daisak Bluni PLLC

(57) ABSTRACT

Exemplary embodiments relate to applications for soft robotic actuators in the manufacturing, packaging, and food preparation industries, among others. Methods and systems are disclosed for packaging target objects using soft robotic actuators, for moving and positioning target objects and/or receptacles, and/or for diverting or sorting objects. By using soft robotic actuators to perform the fixing, positioning, and/or diverting, objects of different sizes and configurations may be manipulated on the same processing line, without the need to reconfigure the line or install new hardware when a new object is received.

19 Claims, 13 Drawing Sheets

Related U.S. Application Data

(60) Provisional application No. 62/341,445, filed on May 25, 2016.

(51) Int. Cl.
  *B25J 9/00* (2006.01)
  *B25J 9/14* (2006.01)
  *F15B 15/10* (2006.01)
  *B25J 11/00* (2006.01)
  *B25J 15/12* (2006.01)

(52) U.S. Cl.
  CPC ............. B25J 15/10 (2013.01); F15B 15/103 (2013.01); *B25J 11/0045* (2013.01); *B25J 15/12* (2013.01)

(58) Field of Classification Search
  CPC ....... B65D 81/052; B66C 1/46; F15B 15/103; B65G 47/908
  See application file for complete search history.

(56) References Cited

U.S. PATENT DOCUMENTS

| | | | | |
|---|---|---|---|---|
| 3,343,864 | A * | 9/1967 | Baer James | B25J 15/0023 |
| | | | | 294/119.3 |
| 3,398,501 | A * | 8/1968 | Aninger | B65D 81/052 |
| | | | | 53/474 |
| 5,184,727 | A * | 2/1993 | Dickie | B65D 81/052 |
| | | | | 206/522 |
| 5,536,056 | A * | 7/1996 | Clarke | B01J 19/0046 |
| | | | | 294/119.3 |
| 6,729,110 | B2 * | 5/2004 | Sperry | B65D 31/14 |
| | | | | 53/503 |
| 6,990,788 | B2 * | 1/2006 | Peterse | B65D 81/052 |
| | | | | 53/472 |
| 9,975,251 | B2 * | 5/2018 | Lessing | B25J 15/10 |
| 10,597,275 | B2 * | 3/2020 | Lessing | B67C 3/007 |
| 2005/0081711 | A1 * | 4/2005 | Kerekes | B62D 35/005 |
| | | | | 92/48 |

* cited by examiner

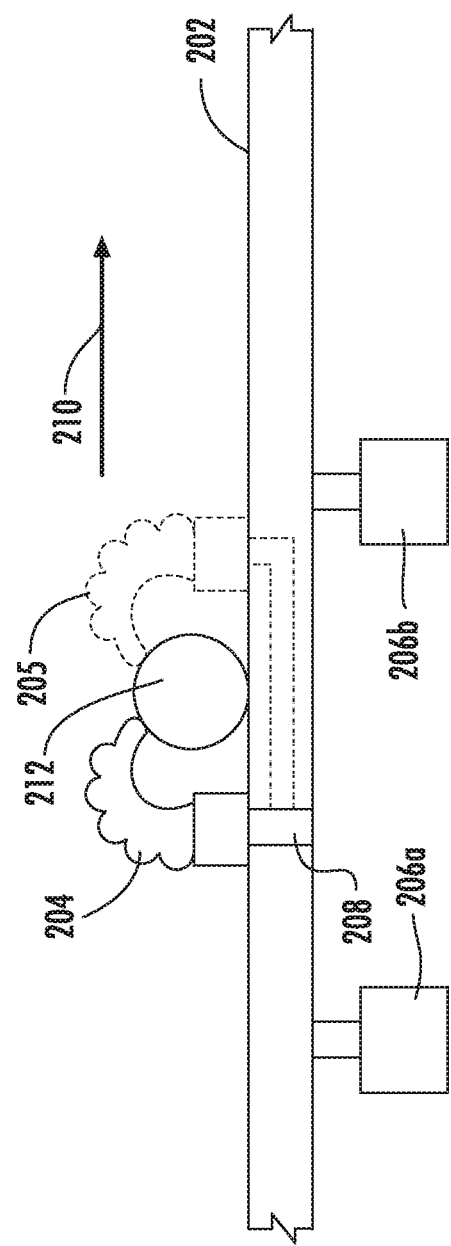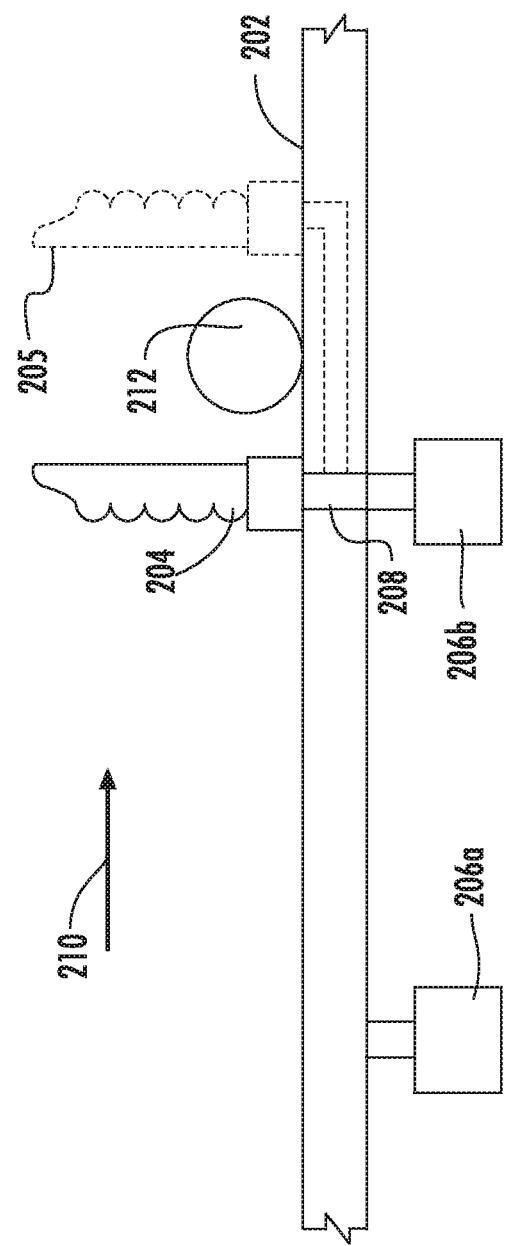

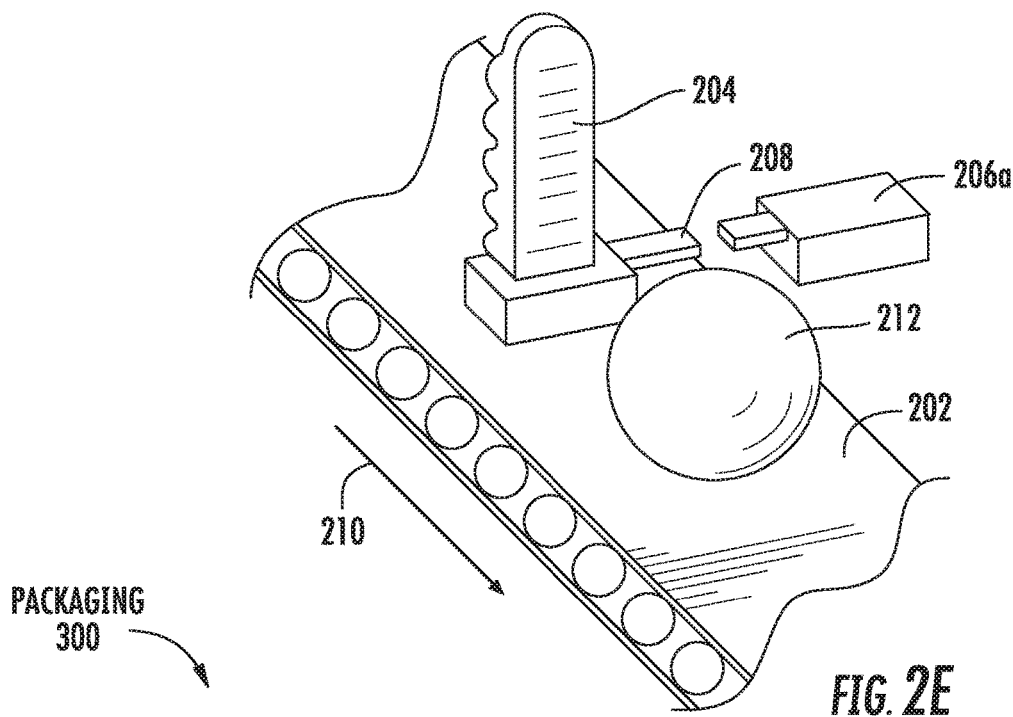
FIG. 2E
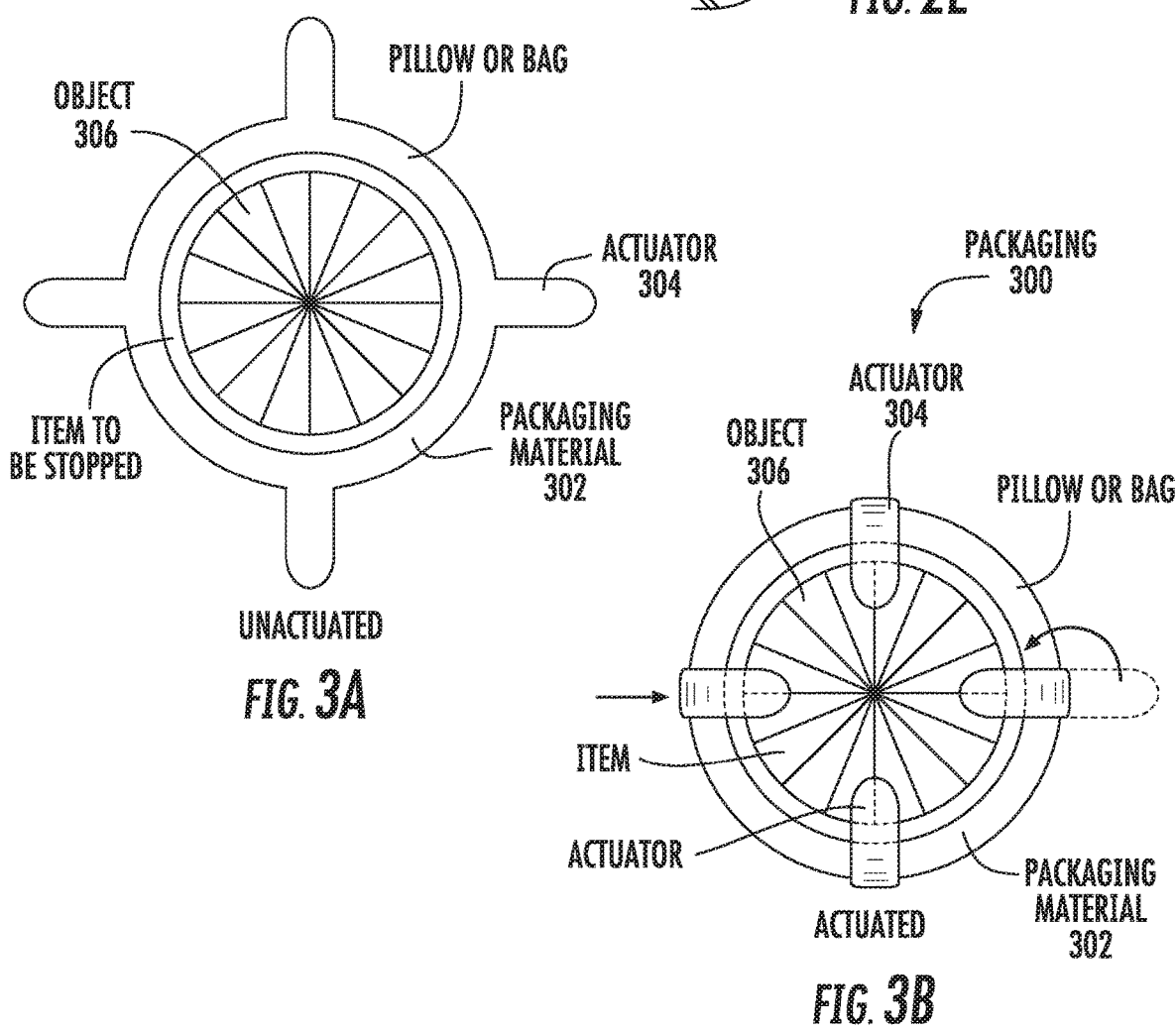
FIG. 3A
FIG. 3B

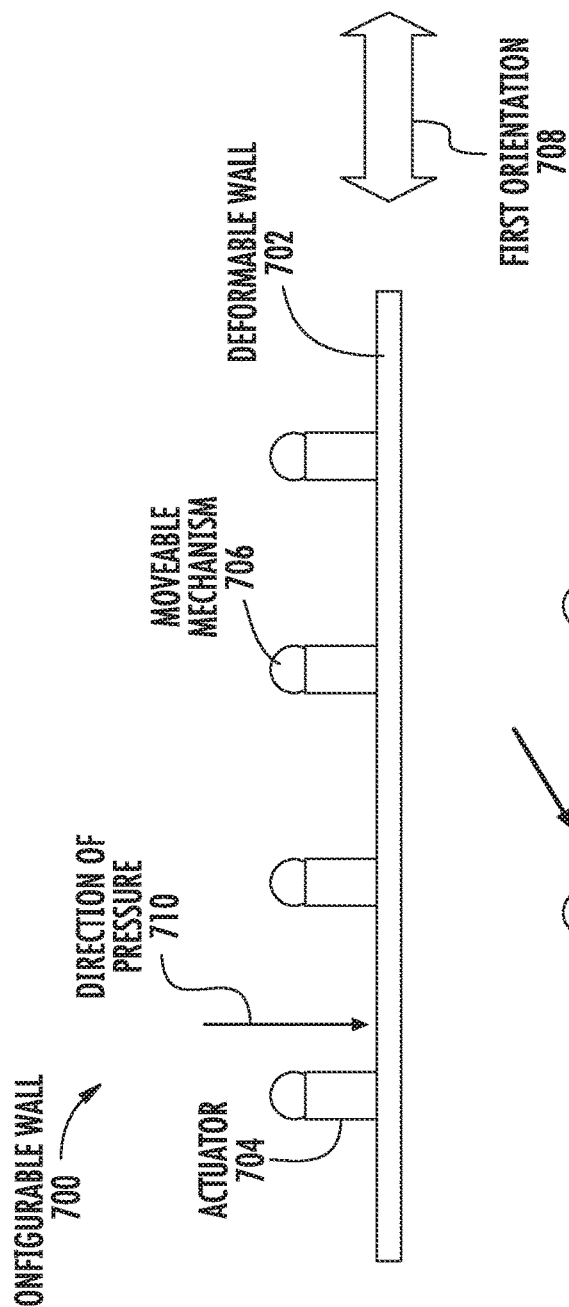

(TOP DOWN VIEW, CARTESIAN ARRANGEMENT)

(PERSPECTIVE SIDE VIEW CARTESIAN ARRANGEMENT)

(TOP DOWN VIEW, RADIAL ARRANGEMENT)

SOFT ROBOTIC ACTUATORS FOR POSITIONING, PACKAGING, AND ASSEMBLING

RELATED APPLICATIONS

The present application is a continuation of U.S. application Ser. No. 15/605,499, filed on May 25, 2017, which claims priority to U.S. Provisional Application Ser. No. 62/341,445, filed on May 25, 2016 and entitled "Soft Robotic Actuators for Positioning, Packaging, and Assembling."

This application is also related to U.S. patent application Ser. No. 15/482,050, filed on Apr. 7, 2017 and entitled "Soft Robotic Actuators for Positioning, Packaging, and Assembling."

The contents of the aforementioned applications are incorporated herein by reference.

FIELD OF THE DISCLOSURE

The disclosure relates generally to the field of robotics and automation and particularly to novel applications for soft robotic actuators in the manufacturing, packaging, and food preparation industries, among others.

BACKGROUND

Traditionally, fixturing, positioning and redirecting devices employed in manufacturing, packaging, and food preparation have predominantly employed hard components for interacting with the object to be gripped and/or manipulated. Hard fixturing, positioning and redirecting devices employ structures for interacting with an object of interest that are relatively non-compliant. Because hard structures do not readily conform to the target being grasped, they can be limited in some respects when employed in connection with certain applications.

SUMMARY

Soft robotic grippers provide new opportunities in manipulating target objects for manufacturing, packaging, food preparation, and other related tasks. Exemplary embodiments provide methods and systems for fixing target objects and/or receptacles using soft robotic actuators, for positioning target objects and/or receptacles, for packaging target objects, for easily modifying portions of a manufacturing production line, and/or for diverting or sorting objects. Unless otherwise noted, it is contemplated that the procedures described below may be used alone or in any combination. Features described in connection with one embodiment may be used in connection with another, different embodiment, unless it is noted that the embodiments are incompatible with each other.

In an embodiment, a system may include a moving surface for carrying a target object and a soft robotic actuator in proximity to the moving surface. The soft robotic actuator may comprise an elastomeric body having a reservoir and configured to be inflated by supplying an inflation fluid to the reservoir. The system may further include a controller unit, adjacent to the moving surface, to couple in a fluid-tight seal with an opening in the moving surface that is fluidically connected to the reservoir of the soft robotic actuator when the soft robotic actuator moves into proximity with the controller unit and cause a change in state of the soft robotic actuator via the coupling.

The change in state may include causing the inflation fluid to be delivered to the soft robotic actuator and/or causing the inflation fluid to be removed from the soft robotic actuator. The change in state may cause the target object to be moved from a first location to a second location, to be moved to a second moving surface, to be fixed in place, and/or to be released from a fixed position.

In some embodiments, the soft robotic actuator is movable and the controller unit is stationary with respect to the soft robotic actuator. The soft robotic actuator may be coupled to the moving surface.

In some embodiments, the controller unit is movable and the soft robotic actuator is stationary with respect to the controller unit. In still other embodiments, both the controller unit and the soft robotic actuator are movable.

The controller unit may cause a second change in state of the soft robotic actuator when the soft robotic actuator moves away from the controller unit. The change in state may be made when the actuator and controller approach, depart or are at the same location (or in close proximity) as each other. While change of state may be accomplished via physical paths (e.g., tubing) between the controller and the actuator when they are co-located, a change of state when they are moving with respect to each other may be accomplished in several ways. For example, fluid may be released from the soft actuator via a small orifice or opening on the actuator, where the orifice opening may or may not be controlled by an electronic circuit on the actuator. The circuit may vary the orifice opening based on its pre-configuration or based on external events such as wireless signals from controller, cameras, manipulable switches etc.

The moving surface may be a conveyor belt, a set of rollers, a wheel/starwheel, etc. The soft robotic actuator may be a linearly-extending actuator.

In an embodiment, a method may include placing an object on a packaging material comprising a base and a soft robotic actuator, where the soft robotic actuator comprises a plastic sheet material and/or an elastomeric body having a reservoir and configured to be inflated by supplying an inflation fluid to the reservoir. Alternatively or in addition, the inflation fluid may be a as that results from a chemical reaction that is the result of mixing pouches of chemicals that are already within the volume of the packaging material. Still further, the packaging material may be filled with an expanding foam, such as a urethane foam.

The method may further include delivering the inflation fluid to the soft robotic actuator via a coupling to a control unit, causing the soft robotic actuator to wrap around a portion of the object; sealing the soft robotic actuator in an inflated state; and decoupling the soft robotic actuator from the control unit. The inflation fluid may be sulfur hexafluoride.

The packaging material may include a plurality of soft robotic actuators arranged to wrap around the object when in the inflated state. The plurality of soft robotic actuators may be arranged symmetrically on the packaging material, or asymmetrically on the packaging material.

Each of the plurality of soft robotic actuators may inflated to a fluidic pressure independent of a fluidic pressure of the other soft robotic actuators, or to a same fluidic pressure.

In an embodiment, a packaging system comprises a packaging material to receive an object placed thereon; and a soft robotic actuator comprising an elastomeric body having a reservoir and configured to be inflated by supplying an inflation fluid to the reservoir, or thin walls of plastic in a geometry designed to unfold under inflation. The soft robotic actuator may be coupled to the packaging material and wrap around the object when supplied with the inflation fluid, and be sealed in an inflated state. The packaging material may be inflatable.

In an embodiment, a method may include grasping each of a plurality of objects with one or more of a plurality of inflated soft robotic actuators at a first grip strength, where each soft robotic actuator comprises an elastomeric body having a reservoir configured to be inflated by supplying an inflation fluid to the reservoir and a slow-release mechanism to allow the inflation fluid to escape the reservoir and decrease the first grip strength over time.

The method may further include releasing an object of a first type at a first time when a characteristic of the first type of object exceeds a second grip strength of the soft robotic actuator at the first time, the second grip strength less than the first grip strength; and releasing an object of a second type at a second time when the characteristic of the second type exceeds a third grip strength of the soft robotic actuator at the second time, the third grip strength less than the second grip strength.

The characteristic of a type of object may comprise a weight, a texture, a shape, or a size.

The method may include releasing objects of the first type into a first container or a first location; and releasing objects of the second type in to a second container or a second location.

In an embodiment, a method may include positioning a soft robotic actuator in a deflated state at a location adjacent to a moving surface carrying objects, where the soft robotic actuator comprises an elastomeric body having a reservoir and configured to be inflated by supplying an inflation fluid to the reservoir.

The method may further include delivering the inflation fluid to the soft robotic actuator, via a coupling to a control unit, causing the soft robotic actuator to form a barrier across the moving surface in a direction substantially perpendicular to a direction of motion of the moving surface; and removing the inflation fluid from the soft robotic actuator to remove the barrier when a condition is met. The condition may comprise an accumulation of a specified number of objects behind the barrier, an alignment of an object behind the barrier, and/or redirecting the objects to another moving surface with the barrier, among other possibilities. In some cases, the actuator may elevate an object vertically away from the moving surface rather than, or in addition to, forming a barrier across the moving surface.

In an embodiment, a method may include delivering inflation fluid to a soft robotic actuator, via a coupling to a control unit, causing the soft robotic actuator to form a circular helix around a central axis at a first inflation pressure and having a first pitch. The soft robotic actuator may comprise an elastomeric body having a reservoir and configured to be inflated by supplying an inflation fluid to the reservoir.

The method may further include conveying a target object in contact with the soft robotic actuator from a first end of the soft robotic actuator to a second end of the soft robotic actuator with a rotation of the soft robotic actuator about the central axis.

The method may further include changing the pitch of the helix by changing the inflation pressure; and conveying a second target object in contact with the soft robotic actuator from the first end of the soft robotic actuator to the second end of the soft robotic actuator with a rotation of the soft robotic actuator, wherein the second target object is of a different size than the first target object.

The soft robotic actuator may be inflated around a cylindrical rod.

In an embodiment, a configurable wall may include a deformable wall surface having a length arranged in a first orientation; a soft robotic actuator in contact with the deformable wall surface on a first end and coupled to a movable mechanism on a second end, the soft robotic actuator comprising an elastomeric body having a reservoir and configured to be inflated by supplying an inflation fluid to the reservoir, the soft robotic actuator moveably positioned on the deformable wall surface and operable to apply a pressure to the deformable wall surface in a direction perpendicular to the first orientation when the inflation fluid is delivered into the reservoir causing the deformable wall surface to curve; and a controller unit to couple to the soft robotic actuator to change an amount of the inflation fluid in the reservoir.

The configurable wall may have a plurality of soft robotic actuators disposed along the deformable wall surface in the first orientation. Each of the plurality of soft robotic actuators may be independently movable along the deformable wall surface. Each of the plurality of soft robotic actuators may be independently operable to apply a pressure to the deformable wall surface.

The plurality of soft robotic actuators may cause the deformable wall surface to curve convexly, concavely, or both.

The configurable wall may be positioned adjacent to a moving surface perpendicular to the deformable wall surface carrying objects, wherein the objects are repositioned by contact with the deformable wall surface. In further embodiments, the configurable wall may be in the form of rails and/or walls positioned alongside an automatic folding machine.

In an embodiment, a container may include a substantially flat surface forming a wall; a soft robotic actuator coupled to the surface by a first end, where the soft robotic actuator comprises an elastomeric body having a reservoir and configured to be inflated by supplying an inflation fluid to the reservoir, the soft robotic actuator to extend linearly perpendicularly from the surface to a length according to an amount of the inflation fluid delivered to the reservoir to contact an object placed in the container; and a controller unit to couple to the soft robotic actuator to change an amount of the inflation fluid in the reservoir.

One advantage of these embodiments is that the actuators maintaining the shape of the wall are compliant as compared to conventional walls or rails. Conventionally, such walls or rails are shaped/reshaped by applying stiff rods. However, in the embodiments described herein, the wall or rail is manipulated by spring-like soft actuators. As a result, the wall or rail may partially deflect to absorb the impact from an object and/or may make more conformal contact with an object. Because a rail or wall can be deflected by the actuators, objects of several similar sizes can pass through a given choke point.

Another advantage is that the shape of the wall or rail may be reconfigured by sending new pressure levels to the individual actuators (e.g., via computer or by a PLC connected to a EP transducer).

The container may include a plurality of surfaces forming a three-dimensional container, wherein two or more of the plurality of surfaces is each coupled to a different soft robotic actuator. Each of the different soft robotic actuators may be operable to extend to a length independent of a length of the other soft robotic actuators.

The container may include a plurality of soft robotic actuators coupled to the surface spaced apart from each other in an arrangement, wherein a three dimensional surface is described by the length between the first ends and second ends of the plurality of soft robotic actuators with respect to the surface. The arrangement may be Cartesian or radial. Each of the plurality of soft robotic actuators may be operable to extend to a length independent of a length of the other soft robotic actuators.

BRIEF DESCRIPTION OF THE DRAWINGS

FIGS. 2A-E depicts an example a system according to exemplary embodiments;

FIGS. 3A-B depict an example of a packaging using soft robotic actuators;

FIGS. 7A-C depict various examples of a configurable wall according to exemplary embodiments;

DETAILED DESCRIPTION OF THE EMBODIMENTS

Figure 1A:
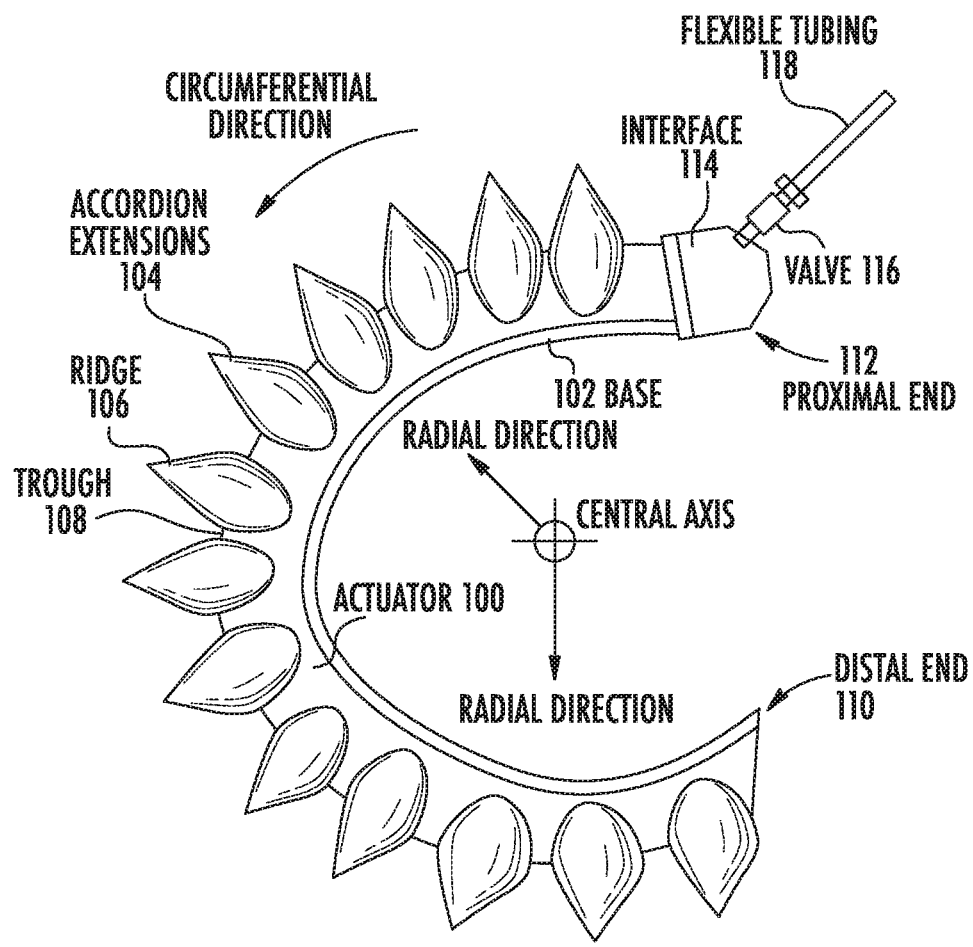
FIGS. 1A-D depict an exemplary soft robotic actuator system.

The present invention will now be described more with reference to the accompanying drawings, in which embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic Grippers

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Moreover, soft robotic actuators allow for types of motions or combinations of motions (including bending, twisting, extending, and contracting) that can be difficult to achieve with traditional hard robotic actuators.

Figure 1B:
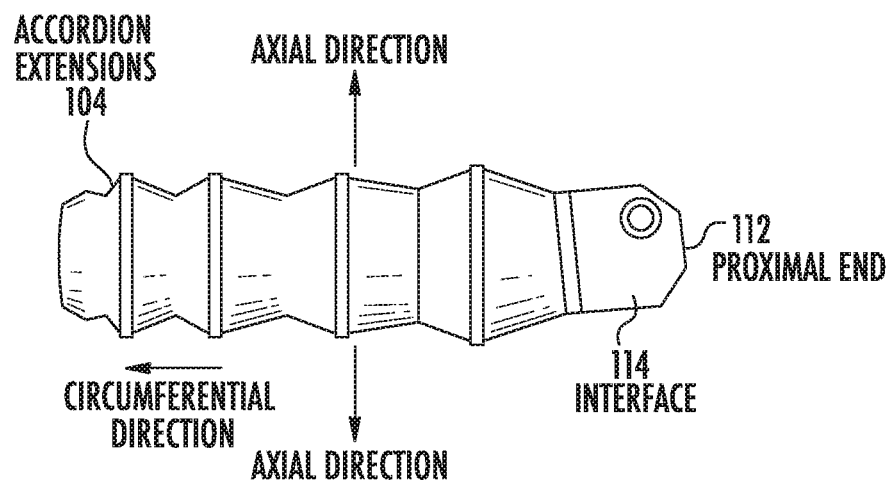
Figure 1C:
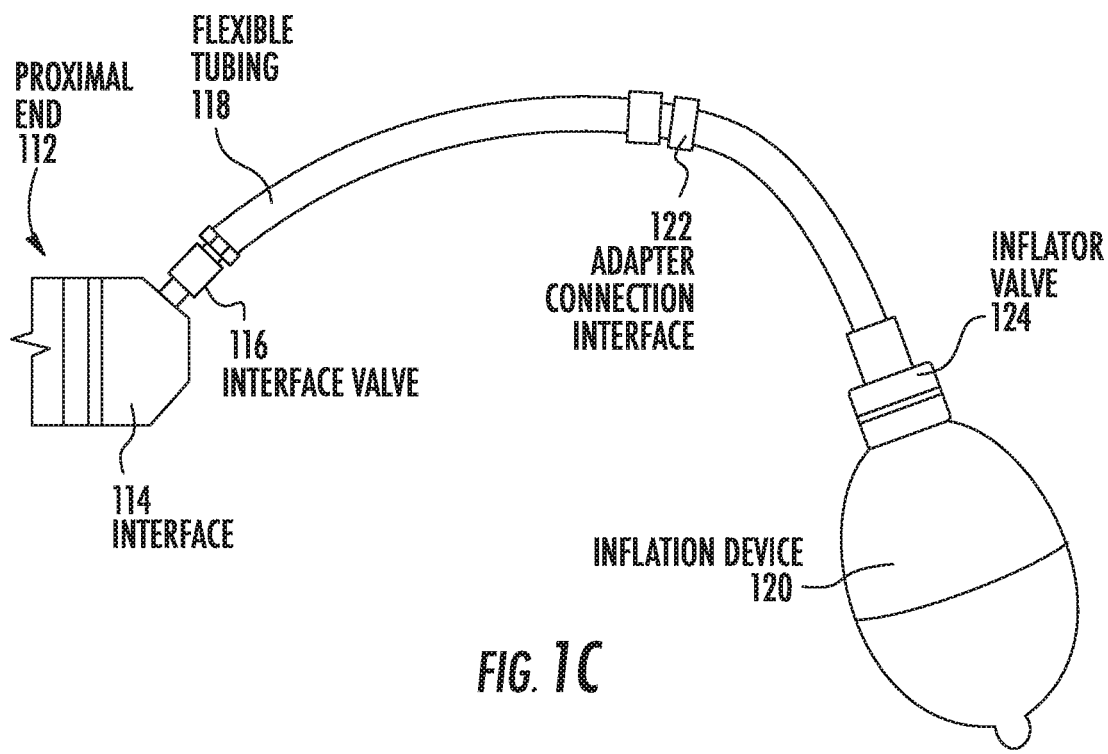
Figure 1D:
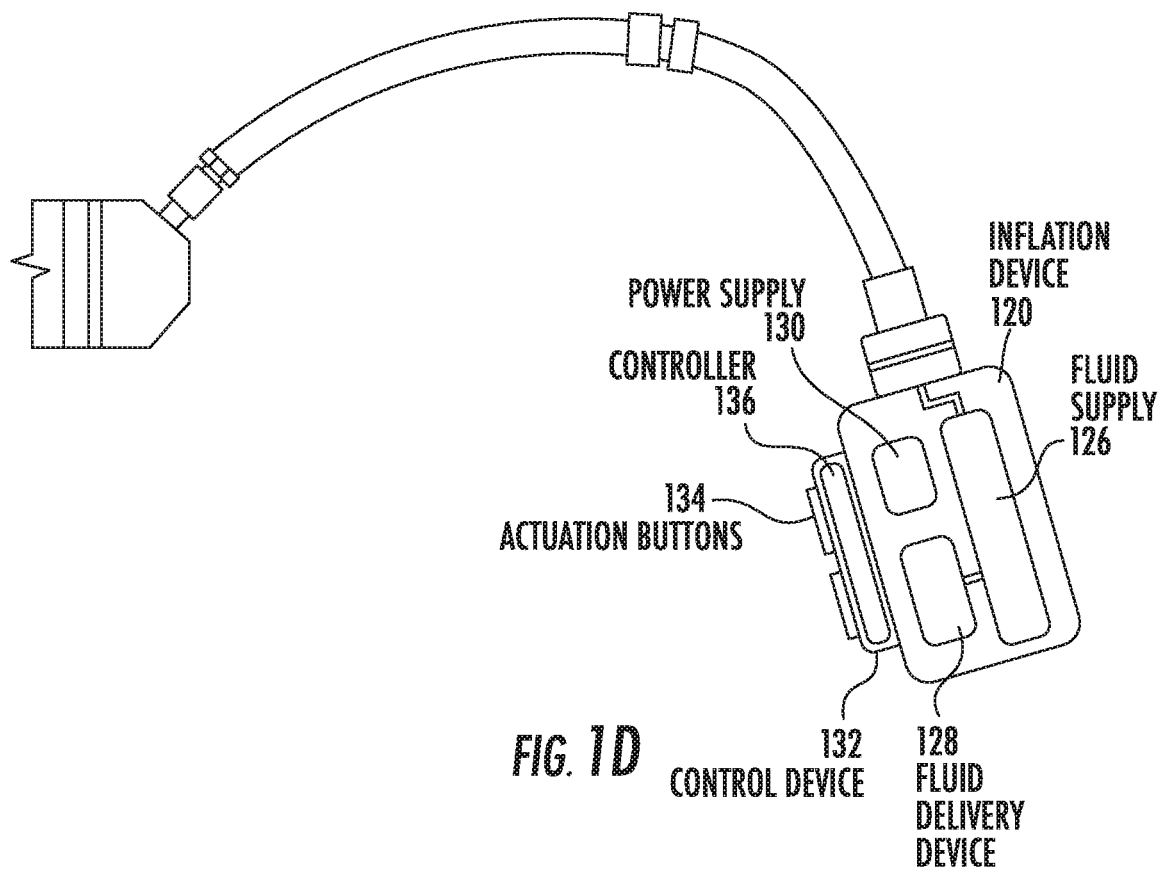

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, saline, or any suitable liquid, gas, gel, foam, etc. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated or deflated, and help to define the shape of the actuator 100 when in an inflated or deflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator 100 to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts. The interface 114 may be made of a food- or medically-safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch, an interface, a touch display, etc.). The control device 132 may include a controller 136 for sending a control signal to the fluid delivery device 128 to cause the fluid delivery device 128 to supply inflation fluid to, or withdraw inflation fluid from, the actuator 100.

Soft robotic actuators may be useful in many instances where a hard actuator is undesirable. For example, and without limitation, a soft actuator may pick up a packaging blank or preform and provide it to a blow molder, after which the blow molder may reshape the blank into the desired form based on the mold. After being shaped, the molded part will typically be quite hot and deformable. The molded part may be retrieved by the soft actuator without damaging or deforming the molded part. The actuator may then hold the molded part while it is being washed, labeled, filled, and/or capped. Other soft actuators may hold live animals gently, such as for inoculation, analysis or surgery.

One problem in conventional blow molding operations is that the object being grasped has a different shape before and after blow molding (transitioning form the packaging blank to the finally-formed product. Whereas a hard gripper may have difficulty adapting to the changing shape (thus perhaps requiring two different types of grippers for a single blow molding operation, a soft actuator may be sufficiently adaptable to grasp both object shapes using the same gripper.

Soft robotic actuators may be inflated with a predetermined amount of inflation fluid (or to a predetermined pressure), and the inflow/outflow of the actuators and/or the internal pressure of the actuator may be measured. Upon making contact with an object, the actuator may be deflected and, as a result, inflation fluid may flow out of (or into) the actuator. This flow of inflation fluid may serve as a detector that indicates the presence of an object at a position or generally in contact with the actuator. Alternatively, the actuator may include touch sensors, bending sensors, or other types of detection devices for registering contact with an object.

FIGS. 1A-1D depict a particular type of soft robotic actuator, sometimes referred to as an accordion-type soft actuator. However, numerous other types of soft actuators exist, some of which are described in connection with particular embodiments below. Soft actuators include actuators formed partially or entirely from soft or compliant materials, and may incorporate or surround more conventional hard actuator materials.

Soft actuators may move in a variety of ways. For example, soft actuators may bend, as shown above, or may twist, as in the example of the soft tentacle actuator described in U.S. patent application Ser. No. 14/480,106, entitled "Flexible Robotic Actuators" and filed on Sep. 8, 2014. In another example, soft actuators may be linear actuators, as described in U.S. patent application Ser. No. 14/801,961, entitled "Soft Actuators and Soft Actuating Devices" and filed on Jul. 17, 2015. Still further, soft actuators may be formed of sheet materials, as in U.S. patent application Ser. No. 14/329,506, entitled "Flexible Robotic Actuators" and filed on Jul. 11, 2014. In yet another example, soft actuators may be made up of composites with embedded fiber structures to form complex shapes, as in U.S. patent application Ser. No. 14/467,758, entitled "Apparatus, System, and Method for Providing Fabric Elastomer Composites as Pneumatic Actuators" and filed on Aug. 25, 2014.

One of ordinary skill in the art will recognize that other configurations and designs of soft actuators are also possible and may be employed with exemplary embodiments described herein.

Exemplary Actuators for Positioning, Packaging, and Assembling

Figure 2A:
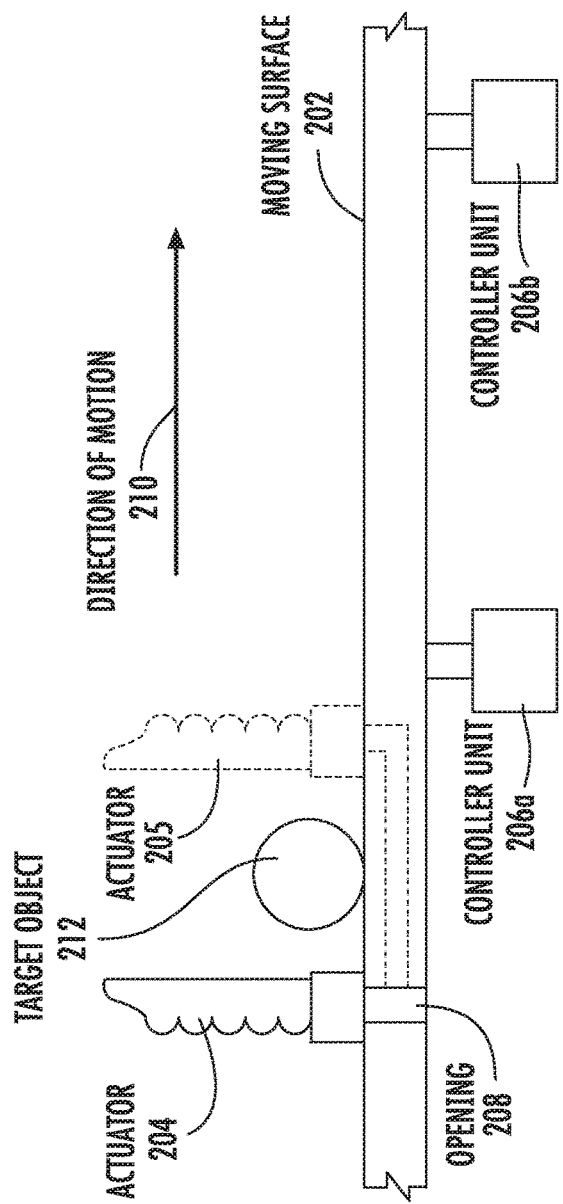

According to one embodiment, as shown in FIG. 2A, one or more soft robotic actuators 204 may be moved over one or more stationary controller units 206. An actuator 204 may be mounted to a moving surface 202, which may be a conveyor belt, rotating wheel, or any other moving surface moving in a direction of motion 210. The moving surface 202 may be positioned over the stationary controller units 206 and may carry one or more target objects 212. The target object may be any object, for example, a bottle, machine part, consumer object, produce, or a receptacle for receiving a plurality of objects.

Although a single actuator 204 is depicted in each controlled position in FIG. 2A, in practice it may often be the case that multiple actuators 204 will be collocated at a given controlled position in order to grasp a target object. The number and configuration of actuators 204 may vary according to the application. For example, FIG. 2A shows an optional second actuator 205 actuated and/or deactuated using the same opening 208 as the first actuator 204.

Figure 2B:
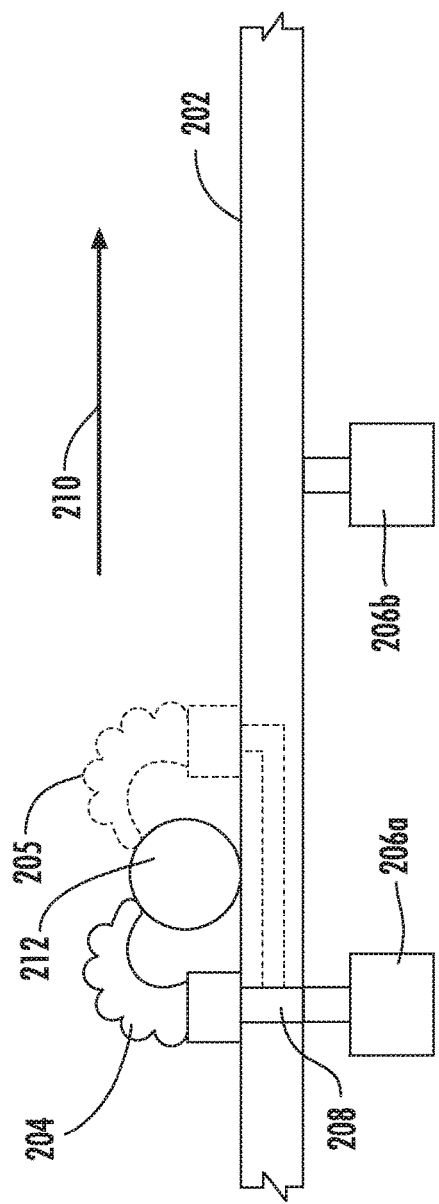

As shown in FIG. 2B, as an actuator 204 moves over a controller unit, e.g. controller unit 206a, the controller unit 206a may apply a change of state to the actuator 204. Changes of state may include, for example, fully or partially actuating the actuator (e.g., by adding a fluid to the actuator to actuate or inflate), or fully or partially de-actuating the actuator (e.g., by applying vacuum to the actuator). As shown in FIG. 2C, the change of state may persist after the actuator 204 moves away from the controller 206a. The change of state may persist permanently or for a set time duration. For example, the change of state may persist until the actuator 204 moves over a different controller unit 206b, which may override the state applied by the first controller unit 206a (FIG. 2D). To this end, the actuator 204 may be provided with a valve or inlet at its proximal end configured to mate with an interface of the controller unit 206a for receiving inflation fluid. When the actuator 204 is moved relative to the controller unit 206a so that the actuator 204 and controller unit 206a are no longer in fluid-tight contact, the valve or inlet may automatically seal to prevent the inflation fluid from exiting the actuator 204.

The actuator 204 may also or alternatively be controlled via electronics, valves, openings, etc. on the actuator 204 itself. For example, the controller unit 206a may actuate the actuator 204, which may then move ahead and de-actuate by action of integrated electronics on the actuator 204. In one embodiment, the electronics may instruct the actuator to release the inflation fluid into the atmosphere based on certain conditions, such as time or the receipt of a control signal (e.g., from a wireless signal from the controller unit 206a or some other source).

In an embodiment, a controller unit 206 may couple to the actuator 204 in a fluid-tight seal via an opening 208 in the moving surface 202 that is fluidically connected to the reservoir of the soft robotic actuator and may effect the change of state via the coupling. In another embodiment, the actuator 204 may be coupled, on the moving surface, to an inflation device. Passing over, in proximity to, a controller unit 206 may cause the controller unit 206 to emit a signal that causes the inflation device to actuate or deactuate the actuator 204. In some cases, controller units 206 may refrain from changing the state of an actuator 204 that passes over them. In some cases, a controller unit causes a second change in state of the actuator 204 when the actuator 204 moves away from the controller unit. For example, the controller unit 206 may initially inflate the actuator 204 when the end effector arrives at a given location associated with the controller unit 206 to grasp a target object, perform an operation on the grasped target object, and then deflate the actuator 204 to release the object. In further cases, the controller 206 may selectively change the state of actuators depending on whether certain conditions are met.

The same controller 206 may be used to actuate multiple fingers at different locations. This may be accomplished via the use of flexible tubings, manifolding etc. to connect multiple soft actuators 204, or multiple points on a moving surface to a single controller. In one embodiment multiple connection points may be provided for a soft actuator 204 on a moving surface and each such point may include an interface valve. Each of these valves may be independently (or collectively) controlled by a single controller 206. The pressure supply source for these connection points may be common or each point may have an independent pressure source.

In another embodiment, the controller units 206 may be movable while the actuator 204 is stationary. For example, actuator 204 may be fixed to a side of the moving surface 202 and the controller units 206 may move beneath, above, or adjacent to the moving surface 202 such that they pass by the actuator 204. In another embodiment, both the controller units 206 and the actuator 204 may be movable with respect to the ground.

Although FIGS. 2A-2E depict an example in which the controller units 206 interface with the actuator 204 through an opening in the moving surface 202, other configurations are also contemplated. For example, FIG. 2E depicts an embodiment in which a control unit 206a is provided to the side of the actuator 204, allowing the controller unit 206a to change the state of the actuator 204 via a side-mounted opening 208.

The actuator 204 may be of any configuration suitable to the purpose of its installation. For example, the actuator 204 may be a linearly-extending actuator; an actuator that curls outwardly or inwardly; a plurality of actuators operating together to grasp an object, an actuator that pins an object against a hard target (such as a target that is part of the moving surface), a twisting actuator, and so forth.

Such embodiments may be useful, for example, to convey a target object from a first location to a second location; to move a target object to a work station; to fix a target object in place (as on a fixture table); to move a target object to a second moving surface, and so forth.

Intelligent Packaging

In some embodiments, soft robotic actuators may be applied as intelligent packaging or directional packaging. For example, as shown in FIG. 3A, an object 306 to be packed, e.g. an impeller, may be placed on packaging material including a base 302 coupled to one or more actuators 304. In the illustrated example, the base 302 is a circular pillow or bag, which is inflated with an inflation fluid, such as a gas or foam. The base 302 may be of any suitable size and/or shape, and may be selected based on the size and/or shape of the object to be packaged. In some embodiments, the base 302 may be omitted entirely and the packaging may be made entirely of actuators 304.

A controller unit (not shown) may receive a control signal instructing the controller to inflate the actuator(s), and in response may cause the actuators to be fully or partially filled with the inflation fluid. When the actuators 304 are actuated by the inflation fluid filling the pillow or bag, the actuators may wrap around the object to be packed.

Once actuated, the state of the actuators may be permanently or semi-permanently retained. For example, the pillow or bag may be sealed to prevent the inflation fluid from escaping. FIG. 3B shows the actuators in the actuated state, where they are curled over the object. Accordingly, the pillow or bag may be provided with an inlet or valve into which inflation fluid may be provided, and which may form a fluid-tight seal (e.g., when closed, or when a sealant is applied over the inlet).

In some embodiments, the inflation fluid may be, or may include, sulfur hexafluoride ($SF_6$). This inflation fluid has a slower diffusion rate, relative to air, through many of the materials used to make packaging bladders making it especially useful as an inflation fluid for intelligent packaging since this will keep the packaging inflated for a longer period of time. Also since $SF_6$ is not common to our atmosphere outside air will gradually diffuse into the bladder due to osmosis keeping the packaging inflated. The diffusion rate in a particular application may depend on the packaging material employed; accordingly, the packaging material may be selected to provide a desired diffusion rate. In some embodiments, the packaging material may be metallised to control the diffusion of the inflation fluid. This may, for example, prevent or slow the rate of air leaving an air-filled packaging material via diffusion.

Although depicted as circular packaging, one of ordinary skill in the art will recognize that the size and shape of the intelligent packaging, as well as the size and configuration of the actuators, may be altered to suit the particular application and/or item to be packed. For example, in some cases, the actuators may be arranged symmetrically about the packaging material, while in other cases, the actuators may be arranged asymmetrically about the packaging material. The resting/starting position of the actuator may be in a plane parallel to or perpendicular or at an angle to the plane of the base 302 or other actuators 304.

In some embodiments, each of the plurality of actuators of a packaging may be inflated to a fluidic pressure independent of a fluidic pressure of the other soft robotic actuators. That is, the fluidic pressure of one actuator may differ from the fluidic pressure of another actuator. In other embodiments, all of the actuators of a packaging may inflated to the same fluidic pressure, which may be the same as the fluidic pressure in the packaging material.

Figure 4:
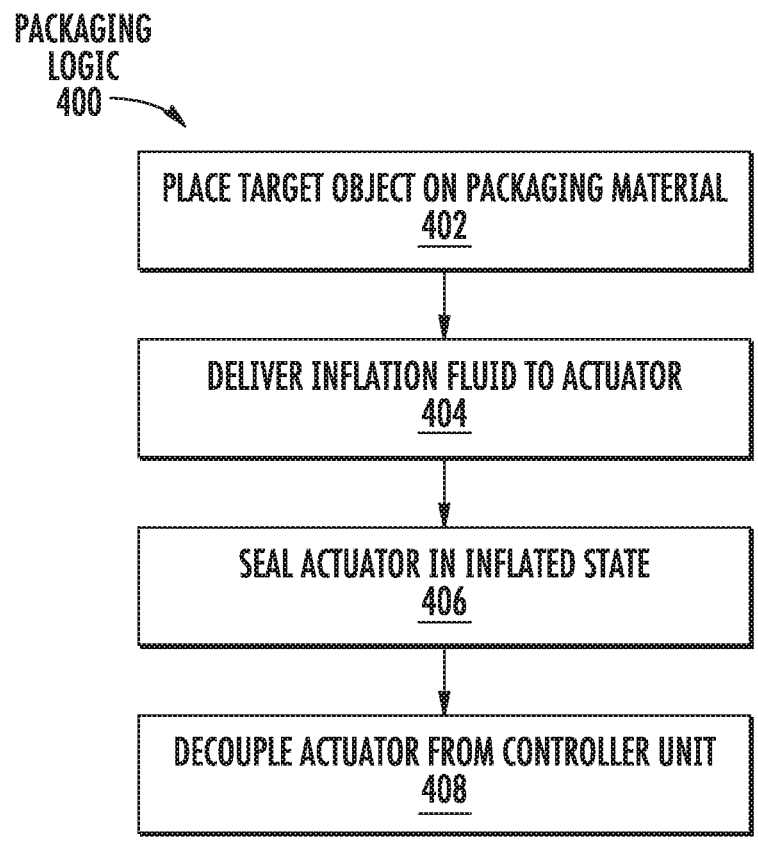
FIG. 4 is a flowchart depicting exemplary logic for performing a method for packaging a target object using packaging that includes soft robotic actuators.

FIG. 4 is a flowchart depicting exemplary logic 400 for performing a packaging method according to exemplary embodiments. Some or all of the logic 400 may be embodied as instructions stored on a non-transitory computer-readable medium that, when executed, causes one or more processors of an electronic device (such as a programmable logic controller) to perform the actions described in FIG. 4. The instructions may be implemented at least partially in hardware. The logic 400 may be performed by a system for packaging a target object using the intelligent packaging depicted in FIG. 3. The logic 400 may be implemented, for example, partially or entirely by transmitting and/or receiving instructions and/or data at a controller associated with the intelligent packaging.

Although the logic described in FIG. 4 (as well as FIG. 6, FIG. 9 and FIG. 10, below) are described as instructions performed by one or more electronic devices, any of the logic described herein may also or alternatively be implemented in an analog manner, such as by logic implemented in a hydraulic or pneumatic system including pneumatic logic, hydraulic logic, mechanical logic or logic implemented by analog electrical circuitry.

The packaging logic 400 may place an object on a packaging material comprising a soft robotic actuator at block 402. The packaging material may be inflatable but not yet inflated, or may be pre-inflated prior to placement of the object. In some embodiments, the packaging material may be a cushioning material that does not require inflation, such as, but not limited to, natural or synthetic rubber or foam. The object may be positioned on the packaging material such that the soft robotic actuator may wrap around a portion of the object when the actuator is inflated.

The packaging logic 400 may deliver the inflation fluid (e.g., a gas, liquid, or an expanding foam) to the soft robotic actuator at block 404, via a coupling to a control unit, causing the soft robotic actuator to wrap around a portion of the object. In some embodiments, the inflation fluid may also be delivered to the packaging material. In the actuated or inflated state, the soft robotic actuator may hold the object against the packaging material and also serve as a cushion against any external packaging.

The packaging logic 400 may seal the soft robotic actuator in an inflated state at block 406. Sealing the soft robotic actuator may cause the soft robotic actuator to retain its configuration wrapped around a portion of the object until the packaging is removed from the object.

The packaging logic 400 may decouple the soft robotic actuator from the controller unit. The controller unit may then be used to actuate other soft robotic actuators and the object and its packaging may be placed into an external packaging for storage, shipping, and so forth.

Adjustable Screw

Figure 5:
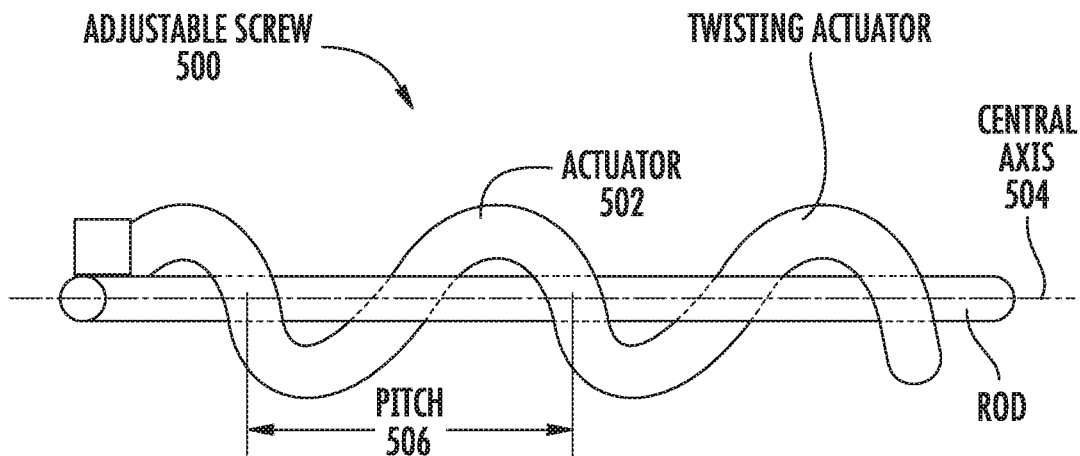
FIG. 5 depicts an example of a soft robotic actuator used as an adjustable screw.

In an embodiment, the materials and/or configuration of a soft robotic actuator may be established so as to encourage a curling motion of the actuator. This may allow, for example, for the actuator to better grasp certain sizes or shapes of objects, such as cylindrical bottles, plant stems, or other curved surfaces. In an application of this technology, as shown in FIG. 5, a twisting actuator 502 may be employed to form a reconfigurable screw by wrapping one or more actuators around a rod or otherwise generally about a central axis 504 to form a helix. The formed helix may be circular, that is, the helix may have a constant radius with respect to the central axis. Such a reconfigurable screw may be employed, for example, as a timing screw in manufacturing, packaging, assembling, etc. Timing screws are particularly useful for controlling the grouping of objects (e.g., how many objects are sent down a conveyor at a given time), controlling the spacing between objects, controlling/combining lanes of objects, and/or reorienting objects (e.g., rotating the objects by 90 degrees in order to change them from an upright configuration to a configuration in which they are laying on their sides).

By inflating different combinations of actuators and/or by varying the amount of inflation fluid provided to one or more actuators, the pitch 506 of the adjustable screw 500 in the direction of the central axis may be adjusted. The pitch of a helix is defined as the height of one complete helix turn, measured parallel to the axis of the helix.

The adjustable screw 500 may be employed, for example, on an assembly or packaging line to capture and direct objects of varying sizes, allowing different objects to be accommodated without the need to provide special-purpose screws of a predetermined size and/or shape. For example, the actuator 502 may convey a target object in contact with it from a first end of the actuator 502, e.g. the left side, to a second end of the actuator 502, e.g. the right side, with a rotation of the actuator 502 about the central axis 504. When the pitch 506 is changed, a second target object of a different size may be conveyed using the same actuator 502.

In another embodiment, a cylindrical actuator may be capable of peristaltic actuation. By continuous inflations and deflations, the actuator may convey an object from one end to the other.

Figure 6:
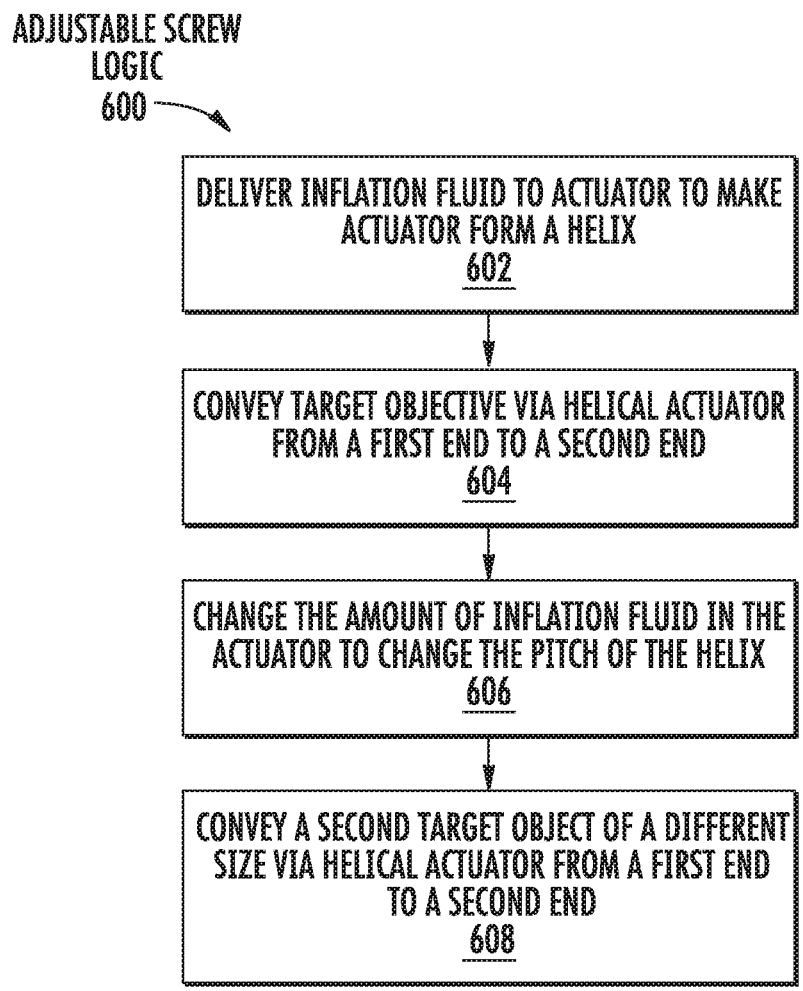
FIG. 6 is a flowchart depicting exemplary logic for performing a method for using an adjustable screw.

FIG. 6 is a flowchart depicting an exemplary method 600 for using an adjustable screw according to exemplary embodiments. The method 600 may be embodied as instructions stored on a non-transitory computer-readable medium that, when executed, causes one or more processors of an electronic device (such as a programmable logic controller) to perform the actions described in FIG. 6. The instructions may be implemented at least partially in hardware. The method 600 may be performed by a system for conveying target objects using the adjustable screw depicted in FIG. 5. The method 600 may be implemented, for example, partially or entirely by transmitting and/or receiving instructions and/or data at a controller associated with the adjustable screw 500.

The adjustable screw method 600 may include delivering inflation fluid to a soft robotic actuator, via a coupling to a control unit, causing the soft robotic actuator to form a circular helix at block 602. The helix may be formed around a central axis at a first inflation pressure and having a first pitch. In some embodiments, the actuators may be extensible such that inflating the actuators to a greater or lesser degree may vary the length of the screw. In some embodiments, the actuators may be configured and/or positioned so that the screw pitch is different at different points along the screw. This variable pitch may be adjusted by changing the actuation state of the actuator.

The adjustable screw method 600 may convey a target object in contact with the soft robotic actuator from a first end of the soft robotic actuator to a second end of the soft robotic actuator at block 604. The target object may be conveyed with a rotation of the soft robotic actuator about the central axis.

The adjustable screw method 600 may change the pitch of the helix by changing the inflation pressure at block 606. For example, in one embodiment, adding inflation fluid, and thereby increasing the inflation pressure, may cause the pitch to decrease to accommodate smaller target objects. Decreasing the amount of inflation fluid and decreasing the inflation pressure, may increase the pitch to accommodate larger target objects.

The adjustable screw method 600 may convey a second target object in contact with the soft robotic actuator from the first end of the soft robotic actuator to the second end of the soft robotic actuator at block 608. The second target object may be of a different size than the first target object. The operation at block 608 may be similar to the operation at block 602, only with a different pitch to the adjustable screw.

Configurable Wall

FIGS. 7A-C illustrates a configurable wall 700. In a configurable wall 700, one or more soft actuators may be employed to change the shape or configuration of a wall or bumper. In some embodiments, the wall 700 may be a rail, bumper, rod, or other suitable object. The location of the actuators on the base may be adjustable. By adjusting the inflation amount on each actuator, the region of the deformable base proximal to the actuator will be provided with a corresponding and variable amount of force. This allows the deformable base to be deployed into a wide variety of shapes and configurations.

FIG. 7A depicts a top-down view of a configurable wall 700 that includes a deformable wall surface 702 having a length arranged in a first orientation 708. As shown, the deformable wall surface 702 is arranged vertically, i.e. as a wall rather than a floor or ceiling, but other embodiments may use the deformable wall surface in any arrangement.

The configurable wall 700 may include one or more soft robotic actuators 704 in contact with the deformable wall surface 702. Each actuator 704 may be coupled to or in contact with the deformable wall surface 702 on a first end of the actuator 704. The other end of the actuator may be coupled to a movable mechanism 706. The movable mechanism 706 may be, for example, a thumb-wheel, a ball bearing, a pulley, or any other mechanism that allows the actuator 704 to be moved.

In some embodiments, the actuator 704 may be connected to a rigid extension of a conveyor in proximity to the configurable wall 700, a rigid mount secured to the floor or ceiling, or some other piece of framing in the local environment.

Each actuator 704 may be coupled to a controller unit (not shown) that may change an amount of the inflation fluid in the reservoir of the actuator 704. When inflation fluid is delivered to the actuator 704, the actuator 704 may be operable to apply a pressure to the deformable wall surface in a direction 710 perpendicular to the first orientation. Actuating an actuator 704 in this manner may cause the deformable wall surface to curve.

In an embodiment, each of the actuators 704 may be movable independently of the other actuators along the deformable wall surface. In an embodiment, each of the actuators 704 may be independently operable to apply a pressure to the deformable wall surface. That is, each actuator 704 may apply a different amount of pressure to the deformable wall surface.

In an embodiment, the actuators 704 may cause the deformable wall surface to curve convexly, concavely, or a combination of convexly and concavely. For example, as shown in FIG. 7B, the deformable wall 702 is curved concavely with respect to the actuators. As shown in FIG. 7C, the deformable wall 702 is curved concavely and convexly with respect to the actuators.

The actuators may also be placed at a height from the base of the wall/rail/rod so that curvature is introduced into the vertical plane as well as the horizontal. Different combinations of soft actuators in different orientations may impart a target three-dimensional shape and/or contours to the wall.

In an embodiment, the configurable wall 700 may be placed along a moving surface carrying objects, e.g. a conveyer, perpendicularly to form a wall along the moving surface. The curvature of the configurable wall 700 may reposition or redirect the object on the moving surface, for example, to change the direction of motion of the objects when they contact the configurable wall 700, to group or align objects, and so forth.

Adjustable Packaging

FIGS. 8A-E depict various examples of containers using soft robotic actuators according to exemplary embodiments.

Figure 8A:
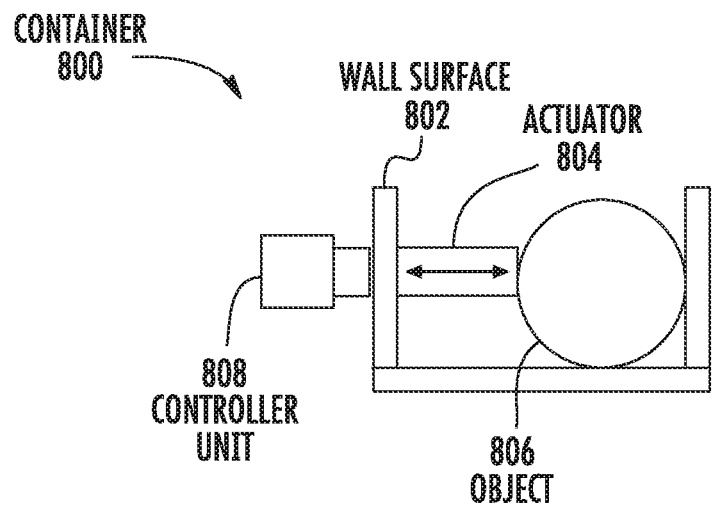
FIGS. 8A-E depict various examples of a container using soft robotic actuators according to exemplary embodiments.

As shown in FIG. 8A, a container, seen from a side view, may include several substantially flat surfaces forming walls, including a base and a top (not shown). One or more of the wall surfaces, e.g. wall surface 802 may include a soft robotic actuator 804 coupled to the wall surface at one end. This allows for at least one interior dimension of the container be adjusted by inflating or deflating the actuators to secure or accommodate different contents for the box or container. As described in the example of intelligent packaging above, the soft robotic actuators may be inflated by various means, including foams and evolving binary chemical reactions.

The actuator 804 may be a linear actuator that extends linearly perpendicularly from the surface 802 to a length according to an amount of the inflation fluid delivered to the reservoir of the actuator 804. When extended, the actuator 804 may contact an object 806 placed in the container to hold the object in place. A controller unit 808 may couple to the actuator 804 to change an amount of the inflation fluid in the reservoir, and may be decoupled once the actuator 804 is positioned to contact the object, or at a specified length.

Figure 8B:
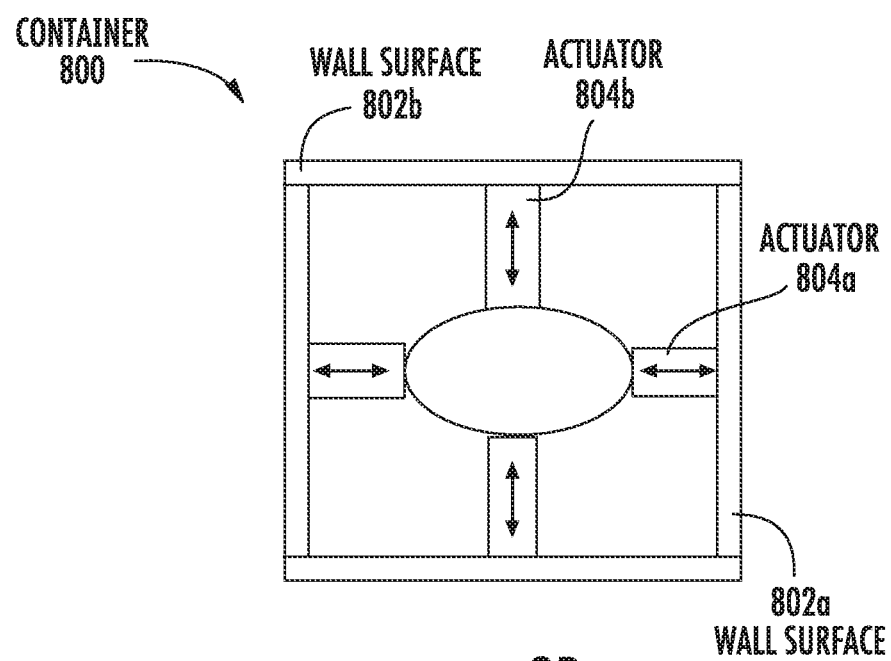

As shown in FIG. 8B, a container, seen from a top view, may have a plurality of surfaces, e.g. 802a and 802b, forming a three-dimensional container, where two or more of the plurality of surfaces is each coupled to a different soft robotic actuator, e.g. 804a and 804b, respectively. In an embodiment, each of the different soft robotic actuators may be extended to a length independent of a length of the other soft robotic actuators, for example, if the object 806 is not symmetric in shape. As shown, for example, actuator 804a is shorter than actuator 804b.

Figure 8C:
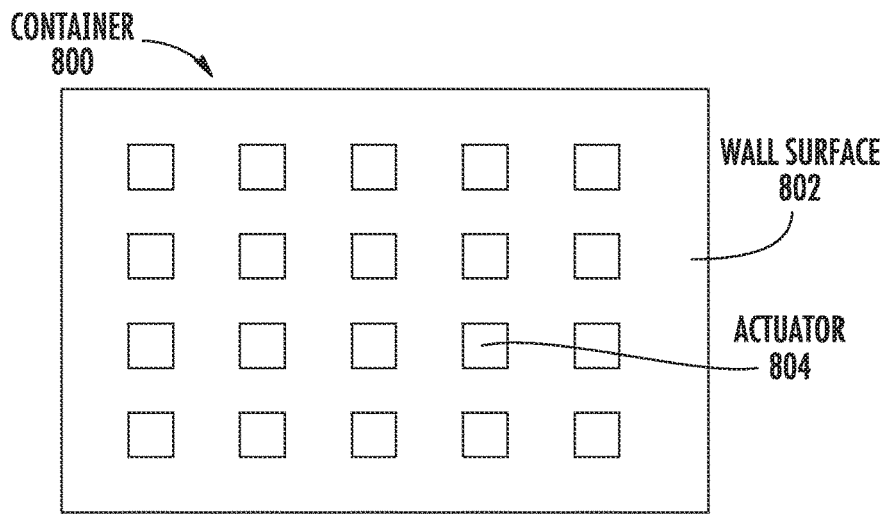

As shown in FIG. 8C, an arrangement of soft actuators 804 may be provided on a base 802 or other surface, with or without surrounding walls. The actuators 804 may be selectively actuated by varying degrees to form a three-dimensional shape. This may allow, for example, objects or packaging of different sizes or configurations to be grasped or supported by the arrangement of actuators. A three-dimensional surface may be formed and described by the length between the first ends and second ends of the plurality of soft robotic actuators with respect to the surface. As shown in FIG. 8C, the arrangement may be radial pattern.

Figure 8D:
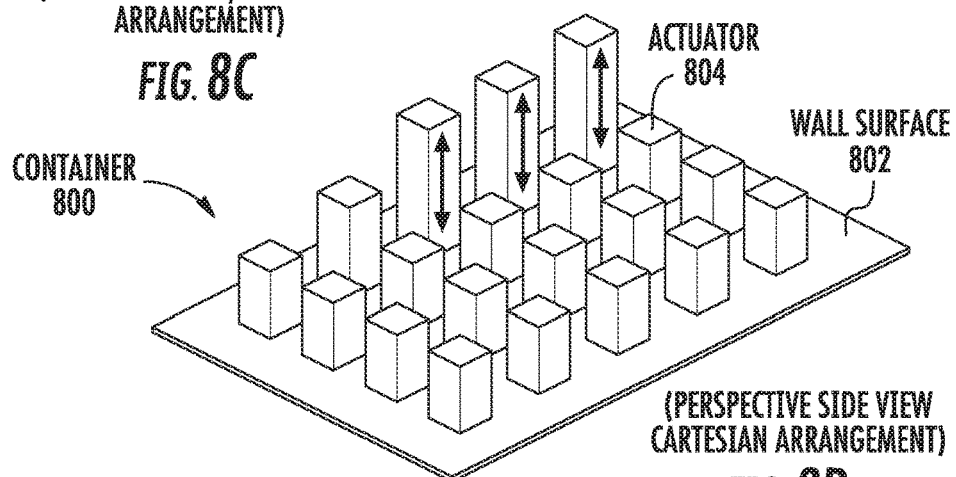
Figure 8E:
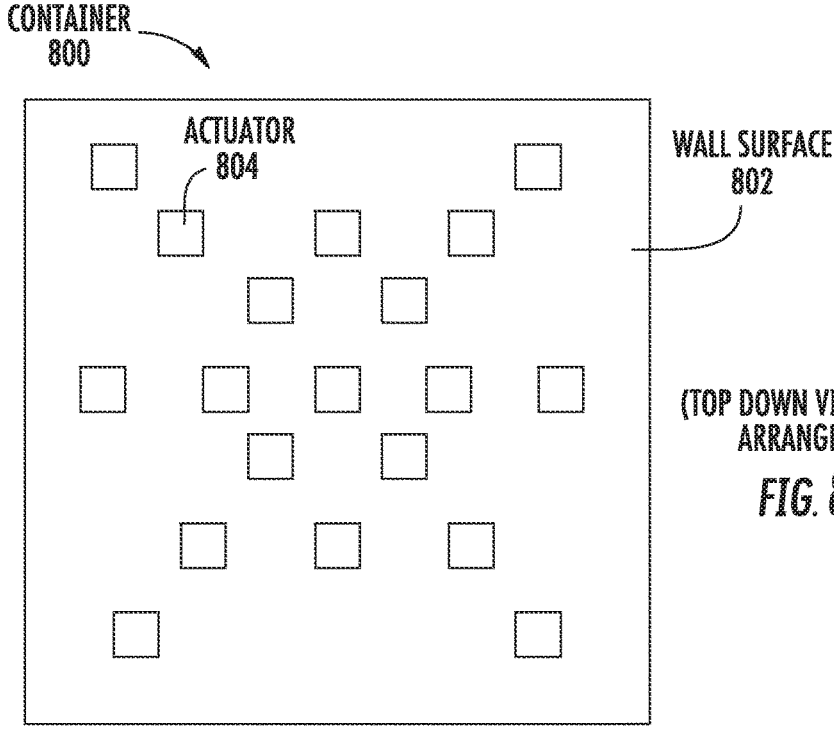

FIG. 8D shows a side view of a Cartesian arrangement of actuators where the length or height of each actuator may differ from the length or height of the other actuators. FIG. 8E shows a radial arrangement of actuators 804.

Although shown as being of the same cross-sectional size, the actuators 804 may differ in size from each other and/or may differ in their behavior when actuated. Some actuators may, for example, grasp an object or a portion of an object, while others contact the object without grasping the object.

Sorting

In some embodiments, a soft robotic actuator may be designed to allow for a slow leak of the inflation fluid (e.g., through a valve or some other release mechanism employing a flow restriction). This allows the actuator to become slowly de-actuated, enabling a slow release of the grasp of the end effector employing the actuator (e.g., being released at a time depending on the weight of the object, the texture of the gripping surface, the texture of the target object, the size or shape of the target object, etc.). This may allow, for example, for the actuator to serve as a sorter or differentiator, releasing different objects at different times depending on the properties of the object (e.g., weight, size, shape, texture). For instance, an end effector moving over a series of boxes may deposit different objects in the boxes at different times depending on the properties of the object currently being grasped.

In another embodiment, the soft actuator may be used to feed objects to a machine or interface via gradual release. The actuators may initially hold an object at the bottom of the target object, so that the actuators directly support the object weight; alternatively, the actuators may hold a vertical surface of the object, so that they support the object by virtue of the friction between the actuators and object. Thereafter, a controller may gradually remove the inflation fluid from the actuator, or may maintain a steady fluid pressure such that the force provided by the actuators is insufficient to sustain the weight of the target object. In both cases, the object gradually slips downwards (due to the force of gravity). In other cases, the force applied may be applied by a spring or other force applying mechanism, which may allow the object to be pushed in any desired direction. Advantageously, at no point in this operation is contact lost between the target object and the actuator (or, contact is only lost for extremely brief periods of time as the objects are released. This process could be used, e.g., for positioning of delicate objects, controlling rate of dispensing of objects, etc.

In yet another embodiment, a stack of objects may be grasped via soft actuators. The actuators could either directly support the stack at its bottom (in which case they would directly support the weight) or could hold the vertical surface of the stack (in which case they would support the stack by virtue of the force of friction between the actuators and the stack). The initial pressure of the fluid may be sufficient to sustain the weight of the stack of target objects. When the pressure of the inflation fluid is reduced by the controller, the force provided by the actuators may be insufficient to sustain the weight of the entire stack. This would cause objects from the stack to slip down due to the force of gravity until the new weight of the stack reduces to a value that can be sustained by the reduced actuator force. This process may be repeated to gradually release and drop objects from the stack. This process may be used for positioning of delicate objects, controlling rate of dispensing of objects etc.

Figure 9:
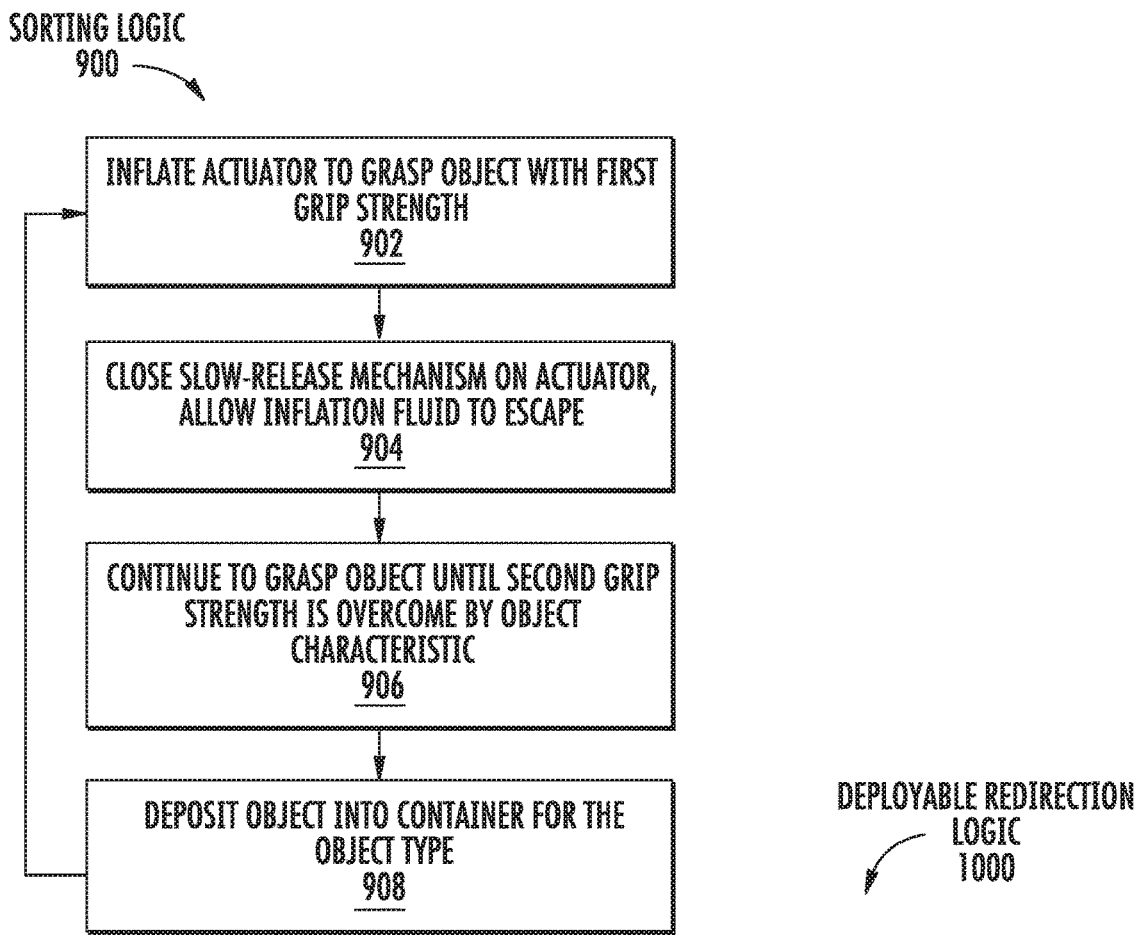
FIG. 9 is a flowchart depicting exemplary logic for performing a method for sorting target objects using a soft robotic actuator with a slow release mechanism.

FIG. 9 is a flowchart depicting exemplary sorting logic 900 for performing a method for sorting target objects using a soft robotic actuator with a slow release mechanism. The logic 900 may be embodied as instructions stored on a non-transitory computer-readable medium that, when executed, causes one or more processors of an electronic device (such as a programmable logic controller) to perform the actions described in FIG. 9. The instructions may be implemented at least partially in hardware.

The sorting logic 900 may grasp each of a plurality of objects with one or more of a plurality of inflated soft robotic actuators at a first grip strength at block 902. Each soft robotic actuator comprises an elastomeric body having a reservoir configured to be inflated by supplying an inflation fluid to the reservoir and a slow-release mechanism to allow the inflation fluid to escape the reservoir and decrease the first grip strength over time by decreasing the inflation pressure.

The sorting logic 900 may release an object of a first type at a first time, at block 904, when a characteristic of the first type of object exceeds a second grip strength of the soft robotic actuator at the first time, the second grip strength less than the first grip strength. A known time period may elapse between block 902 and block 904 during which a known amount of inflation fluid escapes through the slow-release mechanism. After that known time period, all objects of the first type may be released. The characteristic of a type of object may be a weight, a texture, a shape, or a size of the object. For example, when the grip strength of the actuator decreases to a point where a downward force of gravity on the first type of object is stronger than the grip strength of the actuator, the object may be released. The texture, shape or size of an object may also affect when the grip strength of the actuator is overcome. For example, a slippery or smooth object may be released before a rough or sticky object. Release speeds may also be controlled via application of lubrication fluids to the surface of soft actuators or target objects, or through the design of textured surfaces on the soft actuators.

The sorting logic 900 may release an object of a second type, at block 906, at a second time when the characteristic of the second type exceeds a third grip strength of the soft robotic actuator at the second time, the third grip strength less than the second grip strength. Again, another known time period may elapse between block 904 and block 906 during which a known amount of inflation fluid escapes through the slow-release mechanism. After that known time period, all objects of the second type may be released. For example, where a heavier type of object may have been released at block 904, a lighter type of object may be released later at block 906.

The sorting logic 900 may deposit the objects into containers, or at locations, for the object type at block 908. In some embodiments, objects released at block 904 may be placed in a different location than objects released at block 906. For example, the objects of the first type may be placed or released into a first container, and the objects of the second type may be placed or released into a second container, effectively sorting the objects according to the characteristic.

The sorting logic 900 may include instructions that cause the actuators to be moved to the locations for release within the known time periods, or that cause containers to be placed under the actuators within the known time periods.

Deployable Redirection

Figure 10:
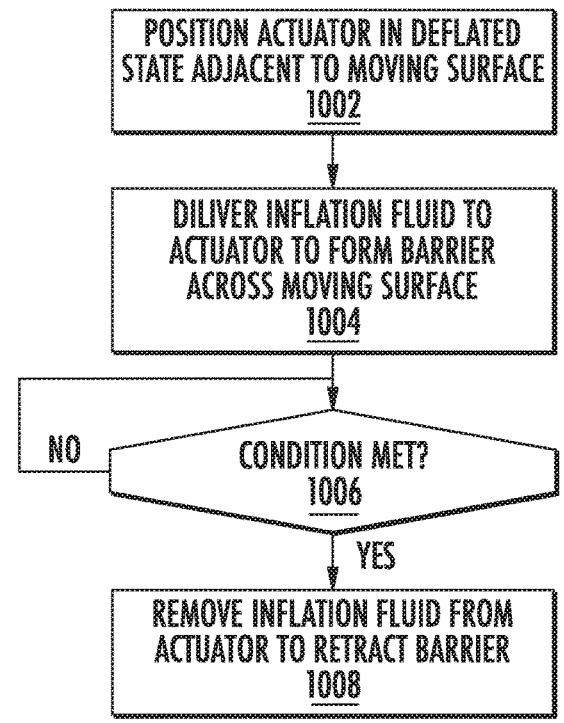
FIG. 10 is a flowchart depicting exemplary logic for performing a method for using a soft robotic actuator as a deployable redirector.

FIG. 10 is a flowchart depicting exemplary deployable redirection logic 1000 for performing a method for using a soft robotic actuator as a deployable redirector. The logic 1000 may be embodied as instructions stored on a non-transitory computer-readable medium that, when executed, causes one or more processors of an electronic device (such as a programmable logic controller) to perform the actions described in FIG. 10. The instructions may be implemented at least partially in hardware.

The deployable redirection logic 1000 may position a soft robotic actuator in a deflated state at a location adjacent to a moving surface carrying objects, at block 1002. The soft robotic actuator comprises an elastomeric body having a reservoir and configured to be inflated by supplying an inflation fluid to the reservoir. The moving surface may be, for example, a conveyor in a production line.

The deployable redirection logic 1000 may deliver the inflation fluid to the soft robotic actuator, via a coupling to a control unit, at block 1004. The inflation fluid may cause the soft robotic actuator to form a barrier across the moving surface in a direction substantially perpendicular to a direction of motion of the moving surface. The barrier may prevent any objects behind the barrier from moving past the barrier in the direction of motion.

The deployable redirection logic 1000 may monitor a condition at block 1006 until the condition is met. In an embodiment, the condition may include an accumulation of a specified number of objects behind the barrier, an alignment of one or more objects behind the barrier, or the redirection, due to the barrier, of a specified number or type of object onto another moving surface.

A system employing the deployable redirection logic 1000 may include various monitoring technologies to determine whether the condition is met. For example, a computer vision system may be used to recognize and count objects, or to identify an alignment or orientation of objects. A scale may be incorporated into a section of the moving surface to determine an amount of objects by weight. Other methods may be used.

The deployable redirection logic 1000 may, when the condition is met, remove the inflation fluid from the soft robotic actuator to remove the barrier at block 1008. In another embodiment, a single actuator or a plurality of actuators may be placed such that when actuated, they form a barrier at an angle across the moving surface. These embodiments could be used to re-direct objects on to nearby conveyors.

Additional Embodiments

Conventional rotary chucks typically have set openings to receive objects of a specific dimension, e.g. a bottle of a specific diameter. Conventional rotary chucks cannot accommodate objects larger than their set openings, and smaller diameter objects may move unpredictably in the opening, making them undesirable in manufacturing processes. Accordingly, in an embodiment, a rotary chuck may include, instead of set openings, a set of soft robotic actuators radially arranged to receive objects of a range of diameters or widths. The actuators may grasp the objects and hold the objects in a known position for manufacturing operations, such as filling, capping, cleaning and so forth. In an embodiment, a wall, bumper, or rotary chuck may include one or more soft actuators that grasp a target object as the object moves past or around the wall, bumper, or rotary chuck. This allows for objects of varying sizes to be accommodated without the need to provide a wall, bumper, or rotary chuck that is specially sized and configured for a specific product.

In another embodiment, a plurality of end effectors may be positioned to grasp an object from a series of alternate locations to provide access to all surfaces of the target item. For example, a first pair of end effectors may grasp the target object from the left and right while an operation is performed on the object, and then a second set of end effectors may grasp the target object from the top and bottom and as the first pair of end effectors releases, additional operations are performed on the object. These embodiments allow access to each surface of the target object to perform operations such as, for example, coating, etching, marking, milling, labeling etc.

Computing System and Network Implementation

Figure 11:
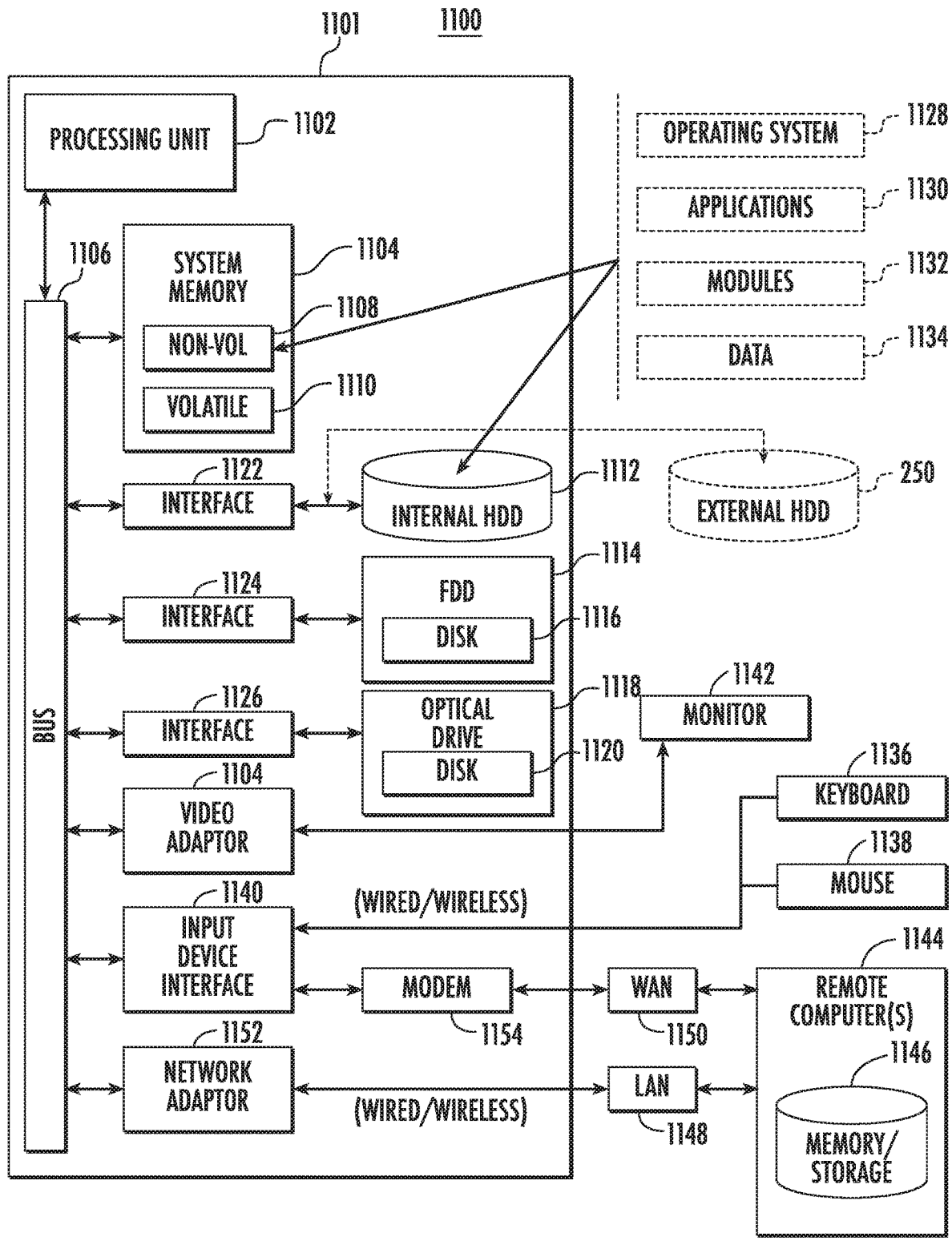
FIG. 11 depicts an electronic device suitable for use in exemplary embodiments.

The above-described methods may be embodied as instructions on a computer readable medium or as part of a computing architecture. FIG. 11 illustrates an embodiment of an exemplary computing architecture 1100 suitable for implementing various embodiments as previously described. In one embodiment, the computing architecture 1100 may comprise or be implemented as part of an electronic device, such as a computer 1101. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1102, a system memory 1104 and a system bus 1106. The processing unit 1102 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1102.

The system bus 1106 provides an interface for system components including, but not limited to, the system memory 1104 to the processing unit 1102. The system bus 1106 can be any of several types of bus structure that may further interconnect to a memory bus (with or without a memory controller), a peripheral bus, and a local bus using any of a variety of commercially available bus architectures. Interface adapters may connect to the system bus 1106 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1104 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1104 can include non-volatile memory 1108 and/or volatile memory 1110. A basic input/output system (BIOS) can be stored in the non-volatile memory 1108.

The computing architecture 1100 may include various types of computer-readable storage media in the form of one or more lower speed memory units, including an internal (or external) hard disk drive (HDD) 1112a (1112b), a magnetic floppy disk drive (FDD) 1114 to read from or write to a removable magnetic disk 1116, and an optical disk drive 1118 to read from or write to a removable optical disk 1120 (e.g., a CD-ROM or DVD). The HDD 1112, FDD 1114 and optical disk drive 1120 can be connected to the system bus 1106 by an HDD interface 1122, an FDD interface 1124 and an optical drive interface 1126, respectively. The HDD interface 1122 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1108, 1112, including an operating system 1128, one or more application programs 1130, other program modules 1132, and program data 1134. In one embodiment, the one or more application programs 1130, other program modules 1132, and program data 1134 can include, for example, the various applications and/or components of the communication system 500.

A user can enter commands and information into the computer 1101 through one or more wire/wireless input devices, for example, a keyboard 1136 and a pointing device, such as a mouse 1138. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1102 through an input device interface 1140 that is coupled to the system bus 1106, but can be connected by other interfaces such as a parallel port, IEEE 694 serial port, a game port, a USB port, an IR interface, and so forth.

A monitor 1142 or other type of display device is also connected to the system bus 1106 via an interface, such as a video adaptor 1144. The monitor 1142 may be internal or external to the computer 1101. In addition to the monitor 1142, a computer typically includes other peripheral output devices, such as speakers, printers, and so forth.

The computer 1101 may operate in a networked environment using logical connections via wire and/or wireless communications to one or more remote computers, such as a remote computer 1144. The remote computer 1144 can be a workstation, a server computer, a router, a personal computer, portable computer, microprocessor-based entertainment appliance, a peer device or other common network node, and typically includes many or all of the elements described relative to the computer 1101, although, for purposes of brevity, only a memory/storage device 1146 is illustrated. The logical connections depicted include wire/wireless connectivity to a local area network (LAN) 1148 and/or larger networks, for example, a wide area network (WAN) 1150. Such LAN and WAN networking environments are commonplace in offices and companies, and facilitate enterprise-wide computer networks, such as intranets, all of which may connect to a global communications network, for example, the Internet.

When used in a LAN networking environment, the computer 1101 is connected to the LAN 1148 through a wire and/or wireless communication network interface or adaptor 1152. The adaptor 1152 can facilitate wire and/or wireless communications to the LAN 1148, which may also include a wireless access point disposed thereon for communicating with the wireless functionality of the adaptor 1152.

When used in a WAN networking environment, the computer 1101 can include a modem 1154, or is connected to a communications server on the WAN 1150, or has other means for establishing communications over the WAN 1150, such as by way of the Internet. The modem 1154, which can be internal or external and a wire and/or wireless device, connects to the system bus 1106 via the input device interface 1140. In a networked environment, program modules depicted relative to the computer 1101, or portions thereof, can be stored in the remote memory/storage device 1146. It will be appreciated that the network connections shown are exemplary and other means of establishing a communications link between the computers can be used.

The computer 1101 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
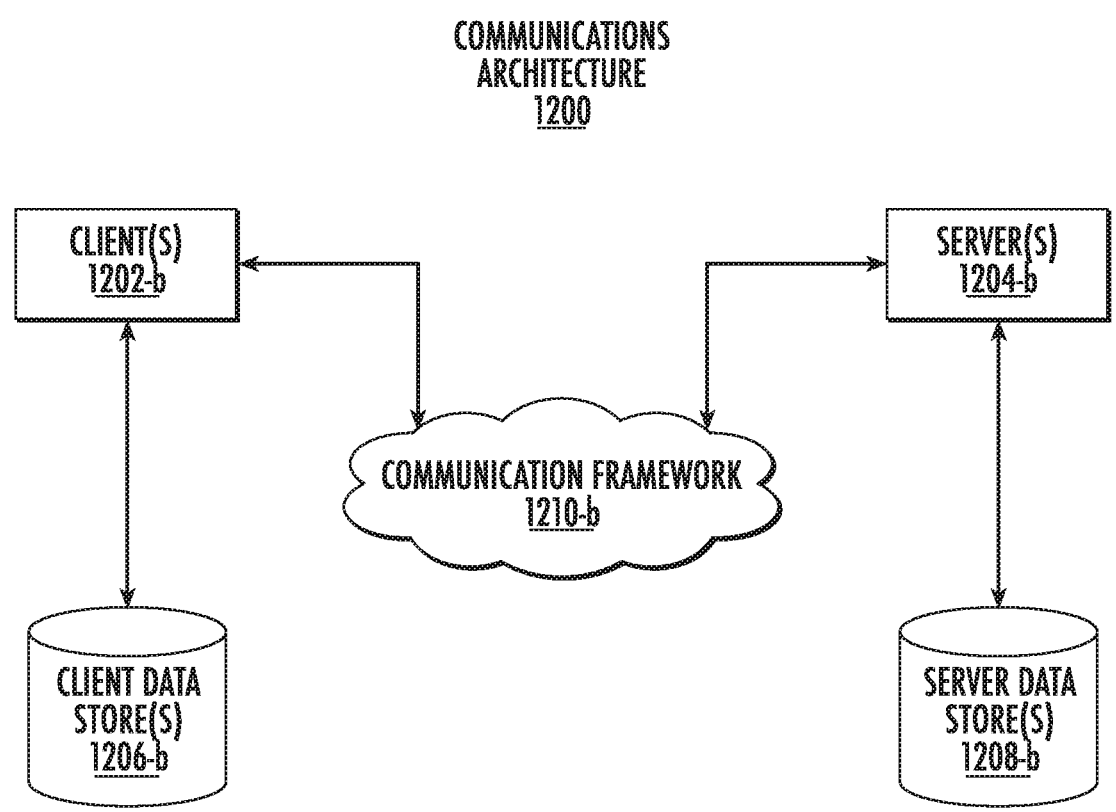
FIG. 12 depicts an exemplary network architecture suitable for use with exemplary embodiments.

FIG. 12 is a block diagram depicting an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 includes one or more clients 1202 and servers 1204. The clients 1202 may implement the client device 1210. The clients 1202 and the servers 1204 are operatively connected to one or more respective client data stores 1206 and server data stores 1208 that can be employed to store information local to the respective clients 1202 and servers 1204, such as cookies and/or associated contextual information.

The clients 1202 and the servers 1204 may communicate information between each other using a communication framework 1210. The communications framework 1210 may implement any well-known communications techniques and protocols. The communications framework 1210 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1210 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Any or all of the above-described techniques may be implemented by suitable logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

The invention claimed is:

1. A method comprising:
    placing an object on a packaging material comprising a base and a soft robotic actuator, the soft robotic actuator comprising one or more accordion extensions that include a series of ridges and troughs arranged to cause the soft robotic actuator to curl around a central axis when inflated and a gripping surface opposite the one or more accordion extensions, and being constructed of a plastic- or elastomer-sheet-material having a reservoir and configured to be inflated by supplying an inflation fluid to the reservoir, wherein the base and actuator are arranged in a configuration so that upon receiving the inflation fluid, the actuator is configured to curl and wrap around a portion of the object to exert a gripping force on the object between the gripping surface of the actuator and a corresponding area of the base;

delivering the inflation fluid to the soft robotic actuator via a coupling to a control unit, causing the soft robotic actuator to curl around the central axis and wrap around the portion of the object;

sealing the soft robotic actuator in an inflated state; and decoupling the soft robotic actuator from the control unit.

2. The method of claim 1, wherein the inflation fluid is sulfur hexafluoride.

3. The method of claim 1, the packaging material comprising a plurality of soft robotic actuators arranged to wrap around the object when in the inflated state.

4. The method of claim 3, wherein the plurality of soft robotic actuators are arranged symmetrically on the packaging material.

5. The method of claim 3, wherein the plurality of soft robotic actuators are arranged asymmetrically on the packaging material.

6. The method of claim 3, comprising inflating each of the plurality of soft robotic actuators to a fluidic pressure independent of a fluidic pressure of the other soft robotic actuators.

7. The method of claim 3, comprising inflating each of the plurality of soft robotic actuators to a same fluidic pressure.

8. The method of claim 1, wherein the packaging material comprises a plurality of soft robotic actuators arranged in a plane parallel to a plane of a base of the packaging material.

9. The method of claim 1, wherein the packaging material comprises a plurality of soft robotic actuators arranged in a plane perpendicular to a plane of the base of the packaging material.

10. A packaging comprising:

an inflatable base configured to be inflated by suppling an inflation fluid to the base, and one or more soft robotic actuators each comprising one or more accordion extensions that include a series of ridges and troughs arranged to cause the soft robotic actuator to curl around a central axis when inflated and a gripping surface opposite the one or more accordion extensions, and being constructed of a plastic- or elastomer-sheet-material having a reservoir and configured to be inflated by supplying the inflation fluid to the reservoir, wherein the plastic- or elastomer-sheet material is selected based on a desired diffusion rate of the inflation fluid to an outside environment;

a coupling providing a fluid connection between a control unit, the base, and the reservoir, wherein the control unit is configured to deliver the inflation fluid to the base and reservoir via the coupling to cause the one or more soft robotic actuators to curl around their respective central axes, the base and one or more soft robotic actuators sized and configured so that upon receiving the inflation fluid, the actuator is configured to curl and wrap around a portion of a target object placed on top of the base, to exert a gripping force on the target object between the gripping surface of the actuator and a corresponding area of the base, the control unit releasably coupled to the soft robotic actuator.

11. The packaging of claim 10, further comprising an inlet or valve configured to be permanently or temporarily sealed to prevent the inflation fluid from escaping the one or more soft robotic actuators.

12. The packaging of claim 10, wherein the inflation fluid is sulfur hexafluoride.

13. The packaging of claim 10, the packaging material comprising a plurality of soft robotic actuators arranged to wrap around the object when in the inflated state.

14. The packaging of claim 13, wherein the plurality of soft robotic actuators are arranged symmetrically on the packaging material.

15. The packaging of claim 13, wherein the plurality of soft robotic actuators are arranged asymmetrically on the packaging material.

16. The packaging of claim 13, wherein the control unit is configured to inflate each of the plurality of soft robotic actuators to a fluidic pressure independent of a fluidic pressure of the other soft robotic actuators.

17. The packaging of claim 13, wherein the plurality of soft robotic actuators are configured to be inflated to a same fluidic pressure via a common inlet.

18. The packaging of claim 10, wherein the packaging material comprises a plurality of soft robotic actuators arranged in a plane parallel to a plane of the base.

19. The packaging of claim 10, wherein the packaging material comprises a plurality of soft robotic actuators arranged in a plane perpendicular to a plane of the base.

* * * * *